United States Patent
Bendersky et al.

(10) Patent No.: US 12,289,308 B2
(45) Date of Patent: *Apr. 29, 2025

(54) NATIVE REMOTE ACCESS TO TARGET RESOURCES USING SECRETLESS CONNECTIONS

(71) Applicant: CyberArk Software Ltd., Petach-Tikva (IL)

(72) Inventors: Arthur Bendersky, Petach-Tikva (IL); Dima Barboi, Petach-Tikva (IL); Tal Zigman, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,119

(22) Filed: Dec. 21, 2022

(65) Prior Publication Data

US 2023/0123524 A1 Apr. 20, 2023

Related U.S. Application Data

(63) Continuation of application No. 17/097,809, filed on Nov. 13, 2020, now Pat. No. 11,552,943.

(51) Int. Cl.
*H04L 9/40* (2022.01)

(52) U.S. Cl.
CPC ...... *H04L 63/0853* (2013.01); *H04L 63/0272* (2013.01); *H04L 63/029* (2013.01); *H04L 63/10* (2013.01)

(58) Field of Classification Search
None
See application file for complete search history.

(56) References Cited

U.S. PATENT DOCUMENTS

| 4,412,285 A * | 10/1983 | Neches | H04L 69/00 |
| | | | 719/310 |
| 4,638,356 A * | 1/1987 | Frezza | H04L 63/12 |
| | | | 725/31 |

(Continued)

OTHER PUBLICATIONS

Kappes et al "Multitenant Access Control for Cloud-Aware Distributed Filesystems," IEEE Transactions on Dependable and Secure Computing, vol. 16, No. 6, pp. 1070-1085 (Year: 2017).*

(Continued)

*Primary Examiner* — Luu T Pham
*Assistant Examiner* — James J Wilcox
(74) *Attorney, Agent, or Firm* — Finnegan, Henderson, Farabow, Garrett & Dunner, LLP

(57) ABSTRACT

Disclosed embodiments relate to systems and methods for securely establishing secretless and remote native access sessions. Techniques include identifying a client configured to participate in remote native access sessions, wherein the client has a remote access protocol file that has been modified to include an identifier associated with the client; sending a prompt to the client to establish a secure tunnel connection with a connection agent using the identifier associated with the client; and authentication the client. The techniques may further include accessing target identity information associated with one or more target resources; receiving from the client a token that identifies a target resource from among the one or more target resources; obtaining, based on the token, a credential required for secure access to the target resource; and initiating, using the credential, a remote native access session between the client and the target resource.

18 Claims, 5 Drawing Sheets

(56) References Cited

U.S. PATENT DOCUMENTS

| | | | | |
|---|---|---|---|---|
| 4,812,843 A * | 3/1989 | Champion, III | ............................ | |
| | | | G08G 1/096775 | |
| | | | 455/701 | |
| 5,594,809 A * | 1/1997 | Kopec | ............... | G06F 18/295 |
| | | | | 382/161 |
| 5,745,610 A * | 4/1998 | Johnson | ............. | G06F 16/5854 |
| | | | | 707/E17.026 |
| 5,966,705 A * | 10/1999 | Koneru | ................ | G06F 16/957 |
| | | | | 707/999.009 |
| 6,173,295 B1 * | 1/2001 | Goertz | ................ | G06F 3/1205 |
| | | | | 715/209 |
| 6,321,333 B1 * | 11/2001 | Murray | ................ | H04L 9/3265 |
| | | | | 713/168 |
| 6,574,730 B1 * | 6/2003 | Bissell | ................ | H04Q 3/0029 |
| | | | | 713/168 |
| 6,738,772 B2 * | 5/2004 | Regelski | ................ | G06F 16/27 |
| | | | | 707/999.009 |
| 6,775,422 B1 * | 8/2004 | Altman | ................... | G06F 16/93 |
| | | | | 707/E17.058 |
| 6,920,519 B1 * | 7/2005 | Beukema | ........... | G06F 12/1027 |
| | | | | 711/E12.013 |
| 6,999,477 B1 * | 2/2006 | Oz | ..................... | H04N 21/4263 |
| | | | | 348/E7.071 |
| 7,120,254 B2 * | 10/2006 | Glick | ..................... | H04L 63/10 |
| | | | | 380/258 |
| 7,360,237 B2 | 4/2008 | Engle et al. | | |
| 7,493,126 B2 * | 2/2009 | Ishii | ........................ | H04W 4/20 |
| | | | | 455/433 |
| 7,610,491 B1 | 10/2009 | Tsao | | |
| 7,619,977 B2 * | 11/2009 | Khan | ................... | H04W 48/18 |
| | | | | 370/235 |
| 7,676,675 B2 | 3/2010 | Billharz et al. | | |
| 7,697,438 B2 * | 4/2010 | Ji | ............................ | H04L 45/00 |
| | | | | 709/239 |
| 7,873,370 B2 * | 1/2011 | Shim | ................... | H04W 4/029 |
| | | | | 455/457 |
| 7,912,822 B2 | 3/2011 | Bethlehem et al. | | |
| 7,917,751 B2 * | 3/2011 | Keohane | ................ | G06F 16/10 |
| | | | | 713/153 |
| 7,934,005 B2 * | 4/2011 | Fascenda | ............ | H04W 12/041 |
| | | | | 726/20 |
| 7,940,929 B1 * | 5/2011 | Sengupta | ............ | G06F 21/6272 |
| | | | | 715/253 |
| 7,962,937 B2 * | 6/2011 | Cho | ........................ | H04N 21/84 |
| | | | | 725/59 |
| 7,966,328 B2 * | 6/2011 | Germeraad | ............ | G06Q 50/18 |
| | | | | 707/936 |
| 8,027,937 B1 * | 9/2011 | Bartholomay | ...... | H04L 41/5041 |
| | | | | 706/47 |
| 8,171,545 B1 * | 5/2012 | Cooley | ................ | G06F 21/562 |
| | | | | 726/22 |
| 8,200,206 B2 * | 6/2012 | Parmar | ................... | H04L 67/02 |
| | | | | 455/411 |
| 8,209,744 B2 * | 6/2012 | Zhu | ..................... | H04L 63/0838 |
| | | | | 713/172 |
| 8,220,041 B2 * | 7/2012 | Boyce | ................... | G06F 21/51 |
| | | | | 726/13 |
| 8,270,948 B2 * | 9/2012 | Oba | ..................... | H04W 12/062 |
| | | | | 713/168 |
| 8,346,265 B2 * | 1/2013 | Strub | ..................... | H04L 63/08 |
| | | | | 370/335 |
| 8,458,780 B1 * | 6/2013 | Takkallapally | ......... | H04L 63/10 |
| | | | | 713/168 |
| 8,462,677 B1 | 6/2013 | Gailloux et al. | | |
| 8,510,818 B2 | 8/2013 | Garg et al. | | |
| 8,528,059 B1 * | 9/2013 | Labana | ................ | H04L 63/08 |
| | | | | 726/19 |
| 8,533,253 B2 * | 9/2013 | McCoy | ............... | G06F 11/3495 |
| | | | | 709/203 |
| 8,572,677 B2 * | 10/2013 | Bartholomay | .......... | H04L 67/51 |
| | | | | 726/1 |
| 8,595,790 B2 * | 11/2013 | Chang | ................... | H04L 67/564 |
| | | | | 726/1 |
| 8,606,807 B2 * | 12/2013 | Drieschner | ........... | G06F 16/957 |
| | | | | 707/765 |
| 8,611,859 B2 * | 12/2013 | Nguyen | ............... | H04W 12/041 |
| | | | | 713/168 |
| 8,613,055 B1 | 12/2013 | Tomilson et al. | | |
| 8,613,070 B1 * | 12/2013 | Borzycki | ............... | H04L 67/104 |
| | | | | 726/8 |
| 8,650,303 B1 * | 2/2014 | Lang | ....................... | G06F 21/51 |
| | | | | 726/11 |
| 8,701,138 B2 * | 4/2014 | Stern | ..................... | H04N 21/812 |
| | | | | 725/35 |
| 8,793,776 B1 * | 7/2014 | Jackson | ................ | H04W 4/021 |
| | | | | 726/7 |
| 8,826,384 B2 * | 9/2014 | Winslow | ................ | H04L 63/30 |
| | | | | 713/153 |
| 8,849,978 B1 * | 9/2014 | Batson | .................... | H04L 67/10 |
| | | | | 709/248 |
| 8,850,049 B1 * | 9/2014 | Qureshi | ................ | H04L 41/046 |
| | | | | 709/224 |
| 8,850,050 B1 * | 9/2014 | Qureshi | ............... | G06F 21/6218 |
| | | | | 709/227 |
| 8,880,827 B2 * | 11/2014 | Weich | ..................... | G06F 21/74 |
| | | | | 713/193 |
| 8,914,870 B2 * | 12/2014 | Huang | ................ | H04L 12/2821 |
| | | | | 726/12 |
| 9,009,334 B1 | 4/2015 | Jenkins et al. | | |
| 9,076,013 B1 * | 7/2015 | Bailey, Jr. | ............. | G06F 21/577 |
| 9,124,596 B2 * | 9/2015 | Yook | .................... | H04L 63/102 |
| 9,143,427 B2 * | 9/2015 | Van Bogaert | ........... | H04L 45/00 |
| 9,166,963 B2 * | 10/2015 | Ramesh | ............... | H04L 63/0218 |
| 9,226,145 B1 * | 12/2015 | Loman | .................. | H04W 12/35 |
| 9,235,838 B2 * | 1/2016 | Gerardi | ............ | G06Q 20/38215 |
| 9,306,949 B1 * | 4/2016 | Richard | ............... | H04L 12/2859 |
| 9,380,040 B1 * | 6/2016 | Aplemakh | ............ | H04L 47/824 |
| 9,386,021 B1 | 7/2016 | Pratt | | |
| 9,391,996 B1 * | 7/2016 | Chin | ....................... | G06F 16/27 |
| 9,430,547 B2 * | 8/2016 | Lightner | ............... | G06F 16/235 |
| 9,443,227 B2 * | 9/2016 | Evans | ..................... | H04L 51/56 |
| 9,558,288 B1 * | 1/2017 | Boswell | ............... | G06F 16/958 |
| 9,582,230 B1 * | 2/2017 | Sankaran | ................ | H04N 1/56 |
| 9,628,448 B2 | 4/2017 | Hayton | | |
| 9,692,770 B2 * | 6/2017 | Ike | ........................ | H04L 63/126 |
| 9,906,457 B2 * | 2/2018 | Kompella | ............... | H04L 45/22 |
| 9,948,612 B1 * | 4/2018 | Jawahar | ............... | H04L 63/0272 |
| 9,992,185 B1 * | 6/2018 | Basha P.R. | .............. | G06F 9/452 |
| 10,003,973 B2 * | 6/2018 | Bolton | .................... | H04L 63/10 |
| 10,027,658 B1 * | 7/2018 | Schwarz | ................ | G06F 21/44 |
| 10,050,957 B1 * | 8/2018 | Farrugia | ............... | H04L 63/0853 |
| 10,069,838 B2 | 9/2018 | Sanso et al. | | |
| 10,085,253 B2 * | 9/2018 | Murphy | ................ | H04L 69/163 |
| 10,200,377 B1 | 2/2019 | Vasquez et al. | | |
| 10,218,679 B1 * | 2/2019 | Jawahar | ................ | H04W 12/08 |
| 10,257,202 B1 * | 4/2019 | Jiang | .................... | G06F 21/313 |
| 10,277,586 B1 | 4/2019 | Yau et al. | | |
| 10,362,057 B1 | 7/2019 | Wu | | |
| 10,375,095 B1 | 8/2019 | Turcotte et al. | | |
| 10,402,804 B1 * | 9/2019 | Wittern, III | ............. | G07F 7/122 |
| 10,404,699 B2 | 9/2019 | Duggana et al. | | |
| 10,454,906 B1 * | 10/2019 | Sharfman | ........... | H04L 63/0428 |
| 10,599,486 B1 * | 3/2020 | Borkar | ................... | G06F 21/629 |
| 10,680,835 B2 * | 6/2020 | Lee | ........................ | H04L 9/0643 |
| 10,776,489 B2 | 9/2020 | Rajcan et al. | | |
| 10,805,210 B1 * | 10/2020 | Kondapavuluru | .... | H04L 63/029 |
| 10,826,861 B1 | 11/2020 | Borg et al. | | |
| 10,834,084 B2 | 11/2020 | Ouellette et al. | | |
| 10,846,108 B1 | 11/2020 | Chung et al. | | |
| 10,853,786 B2 * | 12/2020 | Mancini | ................... | G06Q 20/12 |
| 10,887,337 B1 | 1/2021 | Kim et al. | | |
| 10,911,546 B1 | 2/2021 | Goswami et al. | | |
| 10,917,384 B2 | 2/2021 | Pham | | |
| 10,922,401 B2 | 2/2021 | Wang et al. | | |
| 10,924,468 B2 | 2/2021 | Suresh et al. | | |
| 10,952,106 B2 * | 3/2021 | Li | ......................... | H04W 80/10 |
| 10,984,128 B1 | 4/2021 | Hoffer | ................... | G16B 50/30 |
| 10,999,065 B2 * | 5/2021 | Yang | .................... | H04W 12/08 |
| 11,003,470 B1 | 5/2021 | Galea et al. | | |

(56) References Cited

U.S. PATENT DOCUMENTS

| | | | |
|---|---|---|---|
| 11,038,902 B2* | 6/2021 | Zaw | H04L 63/0209 |
| 11,095,636 B1* | 8/2021 | Sokolov | H04W 12/068 |
| 11,100,237 B2* | 8/2021 | Gu | G06F 40/289 |
| 11,108,868 B2 | 8/2021 | San et al. | |
| 11,159,627 B1 | 10/2021 | Pachkov et al. | |
| 11,182,604 B1* | 11/2021 | Methaniya | G06V 30/412 |
| 11,189,021 B2* | 11/2021 | Shah | G06T 7/11 |
| 11,190,501 B2 | 11/2021 | Balakrishnan et al. | |
| 11,218,307 B1* | 1/2022 | Griffin | H04L 9/32 |
| 11,277,415 B1* | 3/2022 | Rinehart | G06F 21/45 |
| 11,303,633 B1* | 4/2022 | Williams | H04L 63/20 |
| 11,348,685 B2* | 5/2022 | Fish | H04L 63/0281 |
| RE49,242 E* | 10/2022 | Asai | H04W 4/80 |
| 11,463,426 B1* | 10/2022 | Wheeler | H04L 63/102 |
| 11,483,323 B2* | 10/2022 | Lord | H04L 63/0227 |
| 11,495,067 B2* | 11/2022 | Mirkar | A61B 5/01 |
| 11,588,650 B2* | 2/2023 | Poltorak | H04L 63/0272 |
| 11,824,858 B1* | 11/2023 | McKinless | H04L 63/102 |
| 11,836,727 B1* | 12/2023 | Parekh | G06Q 30/0185 |
| 12,045,471 B2* | 7/2024 | Chatterjee | G06F 3/0679 |
| 12,069,187 B2* | 8/2024 | May | H04L 63/0209 |
| 2001/0014912 A1* | 8/2001 | Segal | H04L 63/0218 726/13 |
| 2001/0034841 A1* | 10/2001 | Shambroom | H04L 9/40 709/213 |
| 2001/0042043 A1* | 11/2001 | Shear | H04N 21/2541 375/E7.009 |
| 2002/0007453 A1* | 1/2002 | Nemovicher | H04L 63/105 713/170 |
| 2002/0010798 A1* | 1/2002 | Ben-Shaul | H04L 67/52 707/E17.116 |
| 2002/0016926 A1* | 2/2002 | Nguyen | H04L 43/00 709/220 |
| 2002/0029280 A1* | 3/2002 | Holden | H04L 63/0218 709/227 |
| 2002/0031107 A1* | 3/2002 | Li | H04W 40/248 370/465 |
| 2002/0051201 A1* | 5/2002 | Winter | H04N 1/00167 358/1.16 |
| 2002/0065874 A1* | 5/2002 | Chien | G06F 21/54 709/250 |
| 2002/0111845 A1* | 8/2002 | Chong | G06Q 10/06311 705/7.13 |
| 2002/0116508 A1* | 8/2002 | Khan | H04L 63/0861 709/229 |
| 2002/0131365 A1* | 9/2002 | Barker | H04L 47/12 370/252 |
| 2002/0133718 A1* | 9/2002 | Turbow | H04L 63/0428 726/12 |
| 2002/0145042 A1* | 10/2002 | Knowles | G02B 26/10 235/462.01 |
| 2002/0152373 A1* | 10/2002 | Sun | H04L 63/0428 713/150 |
| 2002/0161903 A1* | 10/2002 | Besaw | G06F 21/6218 709/224 |
| 2002/0187775 A1* | 12/2002 | Corrigan | H04L 67/04 455/414.1 |
| 2002/0191548 A1* | 12/2002 | Ylonen | H04L 63/0272 370/254 |
| 2003/0004919 A1* | 1/2003 | Campbell | G06Q 10/10 |
| 2003/0014646 A1* | 1/2003 | Buddhikot | H04L 63/162 713/184 |
| 2003/0019933 A1* | 1/2003 | Tsikos | G06K 7/10 235/454 |
| 2003/0028650 A1* | 2/2003 | Chen | H04L 63/0272 709/229 |
| 2003/0042303 A1* | 3/2003 | Tsikos | G06K 7/10594 235/384 |
| 2003/0043762 A1 | 3/2003 | Pang et al. | |
| 2003/0051140 A1* | 3/2003 | Buddhikot | H04L 9/0838 713/169 |
| 2003/0078965 A1 | 4/2003 | Cocotis et al. | |
| 2003/0079028 A1* | 4/2003 | Kortum | H04L 69/329 715/741 |
| 2003/0079030 A1 | 4/2003 | Cocotis et al. | |
| 2003/0110137 A1* | 6/2003 | Armingaud | G06F 21/6245 705/64 |
| 2003/0110264 A1* | 6/2003 | Whidby | G06F 8/71 709/227 |
| 2003/0163692 A1* | 8/2003 | Kleinsteiber | H04L 63/104 713/169 |
| 2003/0163727 A1* | 8/2003 | Hammons | H04L 63/0823 709/225 |
| 2003/0200321 A1* | 10/2003 | Chen | H04L 63/0272 709/228 |
| 2003/0204748 A1* | 10/2003 | Chiu | H04W 12/08 455/422.1 |
| 2004/0003280 A1* | 1/2004 | Narayanan | H04W 36/0038 726/12 |
| 2004/0006699 A1* | 1/2004 | von Mueller | H04L 63/0876 713/185 |
| 2004/0010686 A1* | 1/2004 | Goh | G06F 21/575 713/168 |
| 2004/0015705 A1* | 1/2004 | Guerin | G06F 21/33 713/186 |
| 2004/0026496 A1* | 2/2004 | Zuili | G07F 7/0886 235/379 |
| 2004/0029584 A1* | 2/2004 | Le | H04L 63/083 455/423 |
| 2004/0037260 A1* | 2/2004 | Kakemizu | H04W 8/04 370/400 |
| 2004/0077347 A1* | 4/2004 | Lauber | H04L 67/52 340/907 |
| 2004/0083286 A1* | 4/2004 | Holden | H04L 63/126 709/225 |
| 2004/0090950 A1* | 5/2004 | Lauber | H04Q 9/00 370/352 |
| 2004/0093516 A1* | 5/2004 | Hornbeek | H04L 67/12 726/28 |
| 2004/0098619 A1* | 5/2004 | Shay | H04L 63/162 713/153 |
| 2004/0105298 A1* | 6/2004 | Symes | G06F 9/4812 714/E11.207 |
| 2004/0107089 A1* | 6/2004 | Gross | G06Q 10/107 704/10 |
| 2004/0139328 A1* | 7/2004 | Grinberg | H04L 63/0823 713/182 |
| 2004/0221154 A1* | 11/2004 | Aggarwal | H04L 63/0272 713/151 |
| 2004/0236745 A1* | 11/2004 | Keohane | G06F 21/6218 707/999.009 |
| 2004/0249892 A1* | 12/2004 | Barriga | H04L 63/0428 709/206 |
| 2005/0035193 A1* | 2/2005 | Gustin | G06Q 20/042 235/379 |
| 2005/0044415 A1* | 2/2005 | Yook | H04L 63/104 726/4 |
| 2005/0071283 A1* | 3/2005 | Randle | G06Q 20/12 705/75 |
| 2005/0087606 A1* | 4/2005 | McCumber | G06K 1/121 235/491 |
| 2005/0108571 A1* | 5/2005 | Lu | H04L 63/0853 726/4 |
| 2005/0114711 A1 | 5/2005 | Hesselink et al. | |
| 2005/0120082 A1 | 6/2005 | Hesselink et al. | |
| 2005/0138186 A1 | 6/2005 | Hesselink et al. | |
| 2005/0138424 A1* | 6/2005 | Challener | H04W 12/06 726/4 |
| 2005/0144186 A1 | 6/2005 | Hesselink et al. | |
| 2005/0144195 A1 | 6/2005 | Hesselink et al. | |
| 2005/0144200 A1 | 6/2005 | Hesselink et al. | |
| 2005/0149481 A1 | 7/2005 | Hesselink et al. | |
| 2005/0160264 A1* | 7/2005 | Kuhn | H04L 63/045 713/168 |
| 2005/0195780 A1* | 9/2005 | Haverinen | H04L 63/164 370/338 |
| 2005/0204166 A1* | 9/2005 | McKeon | H04L 9/3226 726/5 |

(56) References Cited

U.S. PATENT DOCUMENTS

| | | | |
|---|---|---|---|
| 2005/0232228 A1* | 10/2005 | Dharanikota | H04L 61/10 370/351 |
| 2005/0246349 A1* | 11/2005 | Wielgosz | H04L 47/10 |
| 2005/0273450 A1* | 12/2005 | McMillen | G06V 10/94 |
| 2006/0005017 A1* | 1/2006 | Black | H04L 63/0428 713/165 |
| 2006/0029064 A1* | 2/2006 | Rao | H04L 61/2557 370/389 |
| 2006/0031383 A1* | 2/2006 | Gautier | H04L 67/02 709/217 |
| 2006/0031407 A1* | 2/2006 | Dispensa | H04L 61/25 709/219 |
| 2006/0041581 A1* | 2/2006 | Aghvami | H04M 3/4931 707/999.102 |
| 2006/0059359 A1* | 3/2006 | Reasor | G06F 21/6218 713/182 |
| 2006/0059551 A1* | 3/2006 | Borella | H04L 63/0227 726/13 |
| 2006/0061460 A1 | 3/2006 | Kamen et al. | |
| 2006/0074618 A1 | 4/2006 | Miller et al. | |
| 2006/0075228 A1* | 4/2006 | Black | H04L 63/104 713/167 |
| 2006/0089152 A1* | 4/2006 | Mahonen | H04W 4/02 455/456.1 |
| 2006/0098649 A1* | 5/2006 | Shay | H04L 63/102 370/389 |
| 2006/0123056 A1* | 6/2006 | Darbha | H04N 21/443 |
| 2006/0129627 A1* | 6/2006 | Phillips | H04L 63/10 709/200 |
| 2006/0129815 A1* | 6/2006 | Baldwin | H04L 63/0823 713/168 |
| 2006/0136986 A1* | 6/2006 | Doolittle | H04L 63/1425 726/1 |
| 2006/0139346 A1* | 6/2006 | Jang | H04N 21/234318 375/E7.005 |
| 2006/0161970 A1* | 7/2006 | Hopen | H04L 63/10 726/4 |
| 2006/0230279 A1* | 10/2006 | Morris | H04L 9/321 713/182 |
| 2006/0233376 A1* | 10/2006 | Forsberg | H04L 63/062 380/277 |
| 2006/0236093 A1* | 10/2006 | Brok | H04L 63/0209 713/151 |
| 2006/0274086 A1* | 12/2006 | Forstall | G06T 11/00 345/629 |
| 2007/0025241 A1* | 2/2007 | Nadeau | H04L 45/04 370/241 |
| 2007/0036353 A1* | 2/2007 | Reznik | H04L 63/0428 380/30 |
| 2007/0061460 A1 | 3/2007 | Khan et al. | |
| 2007/0061887 A1* | 3/2007 | Hoover | H04L 45/745 726/26 |
| 2007/0089049 A1* | 4/2007 | Gormish | G06F 40/166 715/224 |
| 2007/0121579 A1* | 5/2007 | Matthews | H04L 45/586 370/351 |
| 2007/0153739 A1* | 7/2007 | Zheng | H04W 12/04 370/331 |
| 2007/0156659 A1* | 7/2007 | Lim | G06F 21/6227 |
| 2007/0157022 A1* | 7/2007 | Blom | H04W 12/062 713/168 |
| 2007/0157288 A1* | 7/2007 | Lim | H04L 63/105 726/1 |
| 2007/0174429 A1* | 7/2007 | Mazzaferri | H04L 63/102 709/218 |
| 2007/0174454 A1* | 7/2007 | Mitchell | H04L 63/029 709/225 |
| 2007/0186000 A1* | 8/2007 | Nikander | H04W 12/069 709/228 |
| 2007/0186099 A1* | 8/2007 | Beck | H04L 63/06 713/159 |
| 2007/0191001 A1* | 8/2007 | Tariq | H04B 7/155 455/426.1 |
| 2007/0192500 A1* | 8/2007 | Lum | H04W 12/121 709/230 |
| 2007/0192858 A1* | 8/2007 | Lum | H04L 63/20 726/22 |
| 2007/0209061 A1* | 9/2007 | Dekeyzer | H04L 61/45 726/3 |
| 2007/0226780 A1* | 9/2007 | Ronneke | H04W 12/122 726/3 |
| 2007/0229350 A1* | 10/2007 | Scalisi | G06Q 10/08 342/350 |
| 2007/0239989 A1* | 10/2007 | Barnett | H04L 63/101 713/185 |
| 2007/0248232 A1* | 10/2007 | Driscoll | H04W 12/0433 713/153 |
| 2007/0250641 A1 | 10/2007 | Flannery et al. | |
| 2008/0032668 A1* | 2/2008 | Alvarado | H04L 63/10 455/410 |
| 2008/0052769 A1* | 2/2008 | Leone | H04W 12/03 726/7 |
| 2008/0060051 A1* | 3/2008 | Lim | G06F 16/93 726/1 |
| 2008/0069011 A1* | 3/2008 | Sekaran | H04L 67/1034 370/260 |
| 2008/0072043 A1* | 3/2008 | Lee | H04W 12/06 713/168 |
| 2008/0178273 A1* | 7/2008 | Weber | H04W 12/08 380/278 |
| 2008/0189764 A1* | 8/2008 | Gronholm | H04L 12/4641 726/3 |
| 2008/0259934 A1* | 10/2008 | Matthews | H04L 41/5054 370/395.53 |
| 2008/0282081 A1 | 11/2008 | Patiejunas | |
| 2008/0295159 A1* | 11/2008 | Sentinelli | G06F 21/43 726/6 |
| 2008/0313716 A1 | 12/2008 | Park | |
| 2009/0010158 A1* | 1/2009 | Filsfils | H04L 43/026 370/231 |
| 2009/0013055 A1 | 1/2009 | Hall, Jr. et al. | |
| 2009/0019281 A1* | 1/2009 | Winslow | H04L 61/5014 713/162 |
| 2009/0024948 A1 | 1/2009 | Anka | |
| 2009/0031414 A1* | 1/2009 | Winter | H04L 63/102 726/15 |
| 2009/0046728 A1* | 2/2009 | Matthews | H04L 63/0272 370/397 |
| 2009/0049163 A1* | 2/2009 | Love | H04L 41/0213 709/223 |
| 2009/0049196 A1* | 2/2009 | Smith | H04L 63/104 709/245 |
| 2009/0064308 A1* | 3/2009 | Komatsu | H04L 63/029 709/249 |
| 2009/0083422 A1* | 3/2009 | McKay | H04L 63/0272 709/225 |
| 2009/0083846 A1* | 3/2009 | Ding | H04L 63/101 726/12 |
| 2009/0097416 A1* | 4/2009 | Gruber | H04L 45/52 370/254 |
| 2009/0133101 A1* | 5/2009 | Saint-Etienne | H04L 69/14 726/3 |
| 2009/0133115 A1* | 5/2009 | Heninger | H04L 63/0272 726/15 |
| 2009/0135833 A1* | 5/2009 | Lee | H04L 47/286 370/395.53 |
| 2009/0164975 A1* | 6/2009 | Natanov | G06F 11/3688 717/127 |
| 2009/0177789 A1* | 7/2009 | Choudhury | H04L 67/12 709/229 |
| 2009/0205046 A1* | 8/2009 | Radosavac | H04L 63/1458 726/23 |
| 2009/0241170 A1* | 9/2009 | Kumar | H04L 47/2458 370/235 |
| 2009/0276204 A1* | 11/2009 | Kumar | H04L 63/0227 726/13 |

(56) References Cited

U.S. PATENT DOCUMENTS

| | | | |
|---|---|---|---|
| 2009/0320116 A1* | 12/2009 | Guo | H04L 63/101 726/9 |
| 2009/0327905 A1* | 12/2009 | Mascarenhas | H04L 67/10 715/738 |
| 2010/0002066 A1 | 1/2010 | Nelson | |
| 2010/0081417 A1* | 4/2010 | Hickie | G06F 21/604 455/414.1 |
| 2010/0107230 A1* | 4/2010 | Tyagi | H04L 65/1076 726/6 |
| 2010/0125902 A1* | 5/2010 | Killian | H04L 63/0272 726/15 |
| 2010/0153704 A1* | 6/2010 | Winslow | H04L 63/10 713/153 |
| 2010/0182983 A1* | 7/2010 | Herscovici | H04L 63/102 370/338 |
| 2010/0242082 A1* | 9/2010 | Keene | H04W 12/065 726/1 |
| 2010/0275031 A1* | 10/2010 | Ferry | H04L 63/029 713/168 |
| 2011/0002341 A1* | 1/2011 | Damola | H04L 65/1036 370/401 |
| 2011/0030029 A1* | 2/2011 | Woo | G06F 21/577 726/1 |
| 2011/0055566 A1* | 3/2011 | Norrman | H04W 12/0431 713/168 |
| 2011/0107409 A1* | 5/2011 | Wilkinson | H04L 63/0815 726/8 |
| 2011/0131403 A1* | 6/2011 | Ibrahim | G06F 21/572 713/2 |
| 2011/0145150 A1* | 6/2011 | Onischuk | G06Q 30/08 705/50 |
| 2011/0145916 A1 | 6/2011 | McKenzie et al. | |
| 2011/0167101 A1* | 7/2011 | Hopen | H04L 47/805 709/202 |
| 2011/0167475 A1 | 7/2011 | Hoover et al. | |
| 2011/0179277 A1* | 7/2011 | Haddad | H04L 9/0827 713/171 |
| 2011/0191842 A1* | 8/2011 | Lindholm | H04L 63/0853 726/9 |
| 2011/0209053 A1* | 8/2011 | Stronger | G06F 21/6245 715/255 |
| 2011/0213965 A1* | 9/2011 | Fu | H04L 63/0823 709/248 |
| 2011/0215921 A1* | 9/2011 | Ben Ayed | H04W 12/06 340/539.11 |
| 2011/0217952 A1* | 9/2011 | Nordstrand | H04W 12/08 455/411 |
| 2011/0231654 A1* | 9/2011 | Somadder | H04L 47/825 713/153 |
| 2011/0238541 A1* | 9/2011 | Challener | G06Q 40/12 718/1 |
| 2011/0239276 A1* | 9/2011 | Garcia Garcia | H04L 63/107 726/4 |
| 2011/0249595 A1* | 10/2011 | Rozov | H04L 12/22 455/410 |
| 2011/0249609 A1* | 10/2011 | Brusilovsky | H04W 12/80 370/315 |
| 2011/0251992 A1 | 10/2011 | Bethlehem et al. | |
| 2011/0258128 A1 | 10/2011 | Hambleton et al. | |
| 2011/0261787 A1* | 10/2011 | Bachmann | H04W 12/037 370/331 |
| 2011/0286459 A1* | 11/2011 | Rembarz | H04L 61/457 370/392 |
| 2011/0289134 A1* | 11/2011 | de los Reyes | H04L 67/01 726/1 |
| 2011/0296186 A1* | 12/2011 | Wong | H04L 63/0428 713/171 |
| 2011/0305339 A1* | 12/2011 | Norrman | H04W 12/50 380/270 |
| 2011/0313782 A1* | 12/2011 | DeMeyer | G06Q 10/06 705/2 |
| 2011/0315763 A1* | 12/2011 | Hochmuth | G06K 19/07 235/380 |
| 2012/0002813 A1* | 1/2012 | Wei | H04W 12/069 380/270 |
| 2012/0002814 A1* | 1/2012 | Wei | H04L 63/0272 380/270 |
| 2012/0002815 A1* | 1/2012 | Wei | H04L 63/0272 380/270 |
| 2012/0005476 A1* | 1/2012 | Wei | H04L 63/0272 713/153 |
| 2012/0005477 A1* | 1/2012 | Wei | H04L 63/166 713/153 |
| 2012/0005745 A1* | 1/2012 | Wei | H04W 12/02 726/15 |
| 2012/0005746 A1* | 1/2012 | Wei | H04W 12/086 726/15 |
| 2012/0016974 A1* | 1/2012 | Bartholomay | H04L 67/51 709/221 |
| 2012/0017270 A1* | 1/2012 | Bartholomay | H04L 41/5064 726/13 |
| 2012/0021605 A1 | 1/2012 | Omura et al. | |
| 2012/0047262 A1* | 2/2012 | Laarakkers | H04W 12/06 709/225 |
| 2012/0054625 A1 | 3/2012 | Pugh et al. | |
| 2012/0079267 A1* | 3/2012 | Lee | H04L 67/02 713/156 |
| 2012/0084838 A1* | 4/2012 | Inforzato | H04L 63/10 726/4 |
| 2012/0084851 A1* | 4/2012 | Neystadt | G06F 21/335 726/9 |
| 2012/0102540 A1* | 4/2012 | Aronson | G06Q 10/10 726/4 |
| 2012/0122424 A1* | 5/2012 | Herscovici | H04W 24/02 455/411 |
| 2012/0167162 A1* | 6/2012 | Raleigh | H04W 12/069 726/1 |
| 2012/0192250 A1* | 7/2012 | Rakan | H04L 9/3231 726/2 |
| 2012/0201457 A1* | 8/2012 | Bart | G06V 30/40 382/176 |
| 2012/0203877 A1* | 8/2012 | Bartholomay | H04L 63/0227 709/221 |
| 2012/0210415 A1* | 8/2012 | Somani | H04L 65/1083 726/9 |
| 2012/0222099 A1* | 8/2012 | Narendra | H04L 63/0853 726/6 |
| 2012/0254602 A1* | 10/2012 | Bhansali | G06F 21/31 713/2 |
| 2012/0260085 A1* | 10/2012 | Van Mengsel | H04L 63/0471 713/150 |
| 2012/0272310 A1 | 10/2012 | Souissi | |
| 2012/0297311 A1* | 11/2012 | Duggal | H04L 67/025 715/740 |
| 2012/0309352 A1* | 12/2012 | Fang | H04L 63/18 455/411 |
| 2013/0007465 A1* | 1/2013 | Movassaghi | G06F 21/34 713/185 |
| 2013/0029641 A1* | 1/2013 | Hickie | H04W 12/088 455/410 |
| 2013/0035056 A1* | 2/2013 | Prasad | H04W 12/062 455/404.1 |
| 2013/0047210 A1* | 2/2013 | Rotman | H04L 63/102 726/3 |
| 2013/0067226 A1* | 3/2013 | Kunde | G06F 21/6227 713/168 |
| 2013/0082822 A1* | 4/2013 | Levenick | G07F 19/209 340/5.73 |
| 2013/0085815 A1* | 4/2013 | Onischuk | G07C 13/00 235/386 |
| 2013/0125201 A1* | 5/2013 | Sprague | G06F 21/6263 726/28 |
| 2013/0125202 A1* | 5/2013 | Sprague | H04L 63/105 726/1 |
| 2013/0125247 A1* | 5/2013 | Sprague | H04L 63/0428 726/28 |

(56) References Cited

U.S. PATENT DOCUMENTS

| | | | |
|---|---|---|---|
| 2013/0163757 A1* | 6/2013 | Bellovin | H04L 63/08 380/255 |
| 2013/0185772 A1* | 7/2013 | Jaudon | H04L 63/08 726/4 |
| 2013/0219268 A1* | 8/2013 | Straten | G06F 40/166 715/256 |
| 2013/0238678 A1 | 9/2013 | Bloom et al. | |
| 2013/0247149 A1* | 9/2013 | Sanft | H04L 63/101 726/4 |
| 2013/0263216 A1 | 10/2013 | Vakil et al. | |
| 2013/0275973 A1* | 10/2013 | Greenfield | G06F 21/10 718/1 |
| 2013/0297973 A1 | 11/2013 | Hyland et al. | |
| 2013/0337771 A1* | 12/2013 | Klein | H04W 4/90 455/411 |
| 2014/0018037 A1 | 1/2014 | Shanmugavadivel et al. | |
| 2014/0026205 A1* | 1/2014 | Guo | H04L 9/3234 726/9 |
| 2014/0026207 A1* | 1/2014 | Wang | H04L 61/5014 370/329 |
| 2014/0032758 A1* | 1/2014 | Barton | H04L 41/00 709/225 |
| 2014/0040993 A1 | 2/2014 | Lorenzo et al. | |
| 2014/0057597 A1* | 2/2014 | Velusamy | H04W 12/08 455/410 |
| 2014/0057599 A1* | 2/2014 | Hazari | H04W 12/062 455/411 |
| 2014/0068247 A1* | 3/2014 | Davis | G07C 9/00309 713/182 |
| 2014/0068725 A1* | 3/2014 | Zhang | H04W 12/06 726/5 |
| 2014/0093079 A1* | 4/2014 | Scott | H04L 9/0819 380/270 |
| 2014/0108670 A1* | 4/2014 | Naik | H04L 41/0856 709/229 |
| 2014/0109174 A1* | 4/2014 | Barton | H04W 12/06 726/1 |
| 2014/0109175 A1* | 4/2014 | Barton | H04L 63/0807 726/1 |
| 2014/0109178 A1* | 4/2014 | Barton | G06F 21/604 726/1 |
| 2014/0122731 A1* | 5/2014 | Burch | H04L 9/321 709/228 |
| 2014/0123237 A1* | 5/2014 | Gaudet | G06F 21/60 726/4 |
| 2014/0137188 A1* | 5/2014 | Bartholomay | H04L 63/0428 709/224 |
| 2014/0157001 A1* | 6/2014 | Buer | G06F 21/572 713/189 |
| 2014/0164774 A1* | 6/2014 | Nord | H04L 9/0861 713/171 |
| 2014/0165163 A1* | 6/2014 | Salkintzis | H04W 12/04 726/5 |
| 2014/0187190 A1* | 7/2014 | Schuler | H04W 12/084 455/404.1 |
| 2014/0201242 A1* | 7/2014 | Bakthavachalam | G06F 21/604 707/785 |
| 2014/0223520 A1* | 8/2014 | Gafni | G06F 21/40 726/4 |
| 2014/0230020 A1* | 8/2014 | Mogaki | H04L 9/3213 726/4 |
| 2014/0231512 A1* | 8/2014 | Onischuk | G07C 13/00 235/386 |
| 2014/0259147 A1* | 9/2014 | L'Heureux | H04L 63/02 726/14 |
| 2014/0289830 A1* | 9/2014 | Lemaster | H04L 63/08 726/12 |
| 2014/0295821 A1* | 10/2014 | Qureshi | H04W 4/50 455/419 |
| 2014/0298420 A1* | 10/2014 | Barton | H04L 63/102 726/4 |
| 2014/0304326 A1* | 10/2014 | Wesley | H04L 67/1095 709/203 |
| 2014/0304837 A1* | 10/2014 | Mogaki | H04L 63/104 726/28 |
| 2014/0330990 A1* | 11/2014 | Lang | H04L 63/107 710/14 |
| 2014/0337965 A1* | 11/2014 | Savini | H04L 63/0272 726/15 |
| 2014/0365281 A1* | 12/2014 | Onischuk | G07C 13/00 705/12 |
| 2014/0369261 A1* | 12/2014 | Noldus | H04L 65/1016 370/328 |
| 2015/0012339 A1* | 1/2015 | Onischuk | G07C 13/00 235/386 |
| 2015/0039483 A1 | 2/2015 | Santarlas | |
| 2015/0039507 A1* | 2/2015 | Wu | G06Q 20/3227 705/44 |
| 2015/0039840 A1* | 2/2015 | Chandra | G06F 13/1663 711/147 |
| 2015/0039908 A1 | 2/2015 | Lee et al. | |
| 2015/0106881 A1* | 4/2015 | Wharton | H04L 67/1097 726/4 |
| 2015/0113172 A1* | 4/2015 | Johnson | H04L 67/75 709/245 |
| 2015/0121487 A1* | 4/2015 | Chastain | H04L 63/123 726/6 |
| 2015/0124708 A1* | 5/2015 | Blankenship | H04W 36/0077 370/329 |
| 2015/0128205 A1* | 5/2015 | Mahaffey | H04L 63/105 726/1 |
| 2015/0148093 A1 | 5/2015 | Huang et al. | |
| 2015/0150115 A1* | 5/2015 | Le Rouzic | H04L 63/029 726/14 |
| 2015/0163206 A1* | 6/2015 | McCarthy | G06F 21/6227 726/4 |
| 2015/0163222 A1* | 6/2015 | Pal | H04L 63/0272 713/168 |
| 2015/0169893 A1* | 6/2015 | Desai | H04W 12/08 726/1 |
| 2015/0188949 A1* | 7/2015 | Mahaffey | H04L 41/0894 726/1 |
| 2015/0199213 A1* | 7/2015 | Desai | G06F 9/468 718/102 |
| 2015/0200949 A1* | 7/2015 | Willhite | H04L 63/1458 726/13 |
| 2015/0215128 A1* | 7/2015 | Pal | H04L 63/0815 713/155 |
| 2015/0222604 A1* | 8/2015 | Ylonen | H04L 9/3263 713/171 |
| 2015/0235017 A1 | 8/2015 | Oberheide et al. | |
| 2015/0254659 A1* | 9/2015 | Kulkarni | G06Q 20/325 705/44 |
| 2015/0281227 A1* | 10/2015 | Fox Ivey | H04L 9/3226 713/168 |
| 2015/0281322 A1 | 10/2015 | Dingwell et al. | |
| 2015/0287302 A1* | 10/2015 | Ruess | G08B 13/19684 348/143 |
| 2015/0310188 A1* | 10/2015 | Ford | H04L 63/101 726/28 |
| 2015/0319144 A1* | 11/2015 | Barton | G06F 9/544 713/168 |
| 2015/0319174 A1* | 11/2015 | Hayton | H04L 63/0884 726/7 |
| 2015/0372983 A1* | 12/2015 | Gmuender | H04L 67/02 726/12 |
| 2015/0373023 A1* | 12/2015 | Walker | G06F 21/6218 726/3 |
| 2015/0381602 A1* | 12/2015 | Grim | H04W 12/30 726/4 |
| 2015/0381633 A1* | 12/2015 | Grim | H04L 63/0861 726/4 |
| 2015/0382195 A1* | 12/2015 | Grim | H04W 12/06 726/4 |
| 2016/0028731 A1* | 1/2016 | Hebron | H04L 63/20 726/5 |

(56) References Cited

U.S. PATENT DOCUMENTS

| | | | |
|---|---|---|---|
| 2016/0050217 A1* | 2/2016 | Mare | H04W 12/06 726/4 |
| 2016/0072815 A1* | 3/2016 | Rieke | H04L 63/101 726/3 |
| 2016/0085962 A1* | 3/2016 | Sokolov | G06F 21/31 726/6 |
| 2016/0087933 A1* | 3/2016 | Johnson | H04L 41/08 709/245 |
| 2016/0094546 A1* | 3/2016 | Innes | H04L 63/0876 713/156 |
| 2016/0096741 A1* | 4/2016 | Lee | B01D 3/42 203/1 |
| 2016/0113006 A1* | 4/2016 | Murphy | H04W 76/12 370/338 |
| 2016/0119379 A1* | 4/2016 | Nadkarni | H04L 63/0263 726/1 |
| 2016/0127905 A1* | 5/2016 | Liu | H04W 12/50 370/338 |
| 2016/0128016 A1* | 5/2016 | Avary | G06Q 30/0185 455/517 |
| 2016/0134596 A1* | 5/2016 | Kovacs | H04L 63/0876 726/7 |
| 2016/0134632 A1* | 5/2016 | Cregg | H04L 12/283 713/168 |
| 2016/0134634 A1* | 5/2016 | Rosendal | H04W 12/065 726/4 |
| 2016/0140659 A1* | 5/2016 | Zeoli | G06Q 40/04 705/37 |
| 2016/0142914 A1* | 5/2016 | He | H04W 12/06 726/12 |
| 2016/0173483 A1 | 6/2016 | Wong et al. | |
| 2016/0173503 A1* | 6/2016 | Knight | H04L 63/12 726/26 |
| 2016/0182487 A1* | 6/2016 | Zhu | H04L 63/083 726/9 |
| 2016/0182507 A1* | 6/2016 | Zhang | H04L 63/0861 726/7 |
| 2016/0182525 A1* | 6/2016 | Zhu | H04L 63/20 726/1 |
| 2016/0197905 A1* | 7/2016 | Libal | H04L 63/102 726/11 |
| 2016/0197909 A1* | 7/2016 | Innes | H04W 12/06 726/6 |
| 2016/0198344 A1* | 7/2016 | Oba | H04W 12/50 455/411 |
| 2016/0205002 A1* | 7/2016 | Rieke | H04L 43/04 709/224 |
| 2016/0205086 A1* | 7/2016 | Zhang | H04L 63/083 726/6 |
| 2016/0205132 A1* | 7/2016 | Ramos | H04L 63/1441 726/22 |
| 2016/0226857 A1* | 8/2016 | Liu | H04W 76/14 |
| 2016/0234286 A1* | 8/2016 | Fausak | H04L 9/3213 |
| 2016/0285844 A1* | 9/2016 | Olivereau | H04W 12/06 |
| 2016/0323280 A1* | 11/2016 | Sade | H04L 63/0807 |
| 2016/0330233 A1* | 11/2016 | Hart | H04L 63/20 |
| 2016/0330613 A1* | 11/2016 | Cook | G06F 9/45558 |
| 2016/0337104 A1* | 11/2016 | Kalligudd | H04W 12/033 |
| 2016/0337346 A1* | 11/2016 | Momchilov | G06F 21/34 |
| 2016/0342784 A1* | 11/2016 | Beveridge | G06F 21/34 |
| 2016/0359857 A1* | 12/2016 | Demirjian | H04L 63/10 |
| 2016/0359908 A1* | 12/2016 | Lam | H04L 63/20 |
| 2016/0371099 A1 | 12/2016 | Woog et al. | |
| 2016/0373251 A1* | 12/2016 | Kumar | H04W 12/068 |
| 2016/0380984 A1* | 12/2016 | Johnson | H04L 63/0485 713/153 |
| 2016/0381024 A1* | 12/2016 | Zhang | H04L 63/10 726/4 |
| 2017/0006648 A1* | 1/2017 | Aronius | H04L 63/164 |
| 2017/0026383 A1* | 1/2017 | Hayton | H04W 12/086 |
| 2017/0034127 A1* | 2/2017 | Singleton, IV | H04L 63/0236 |
| 2017/0034218 A1* | 2/2017 | Rasband | H04W 4/80 |
| 2017/0041296 A1* | 2/2017 | Ford | G06F 21/64 |
| 2017/0054718 A1* | 2/2017 | Banerjee | H04L 63/20 |
| 2017/0063927 A1* | 3/2017 | Schultz | H04L 63/10 |
| 2017/0075958 A1* | 3/2017 | Duffy | G06F 16/2455 |
| 2017/0086069 A1* | 3/2017 | Liu | H04L 9/3213 |
| 2017/0093803 A1* | 3/2017 | Nayshtut | H04L 63/1441 |
| 2017/0093826 A1* | 3/2017 | Werneyer | H04L 63/062 |
| 2017/0093910 A1 | 3/2017 | Gukal et al. | |
| 2017/0111339 A1* | 4/2017 | Lee | H04L 63/06 |
| 2017/0116560 A1* | 4/2017 | Wickstrom | G06Q 40/03 |
| 2017/0118214 A1* | 4/2017 | Vainstein | H04L 63/10 |
| 2017/0126817 A1* | 5/2017 | Poliashenko | H04L 69/18 |
| 2017/0134370 A1* | 5/2017 | Mavrogiannopoulos | H04L 63/0815 |
| 2017/0134423 A1 | 5/2017 | Sysman et al. | |
| 2017/0150364 A1* | 5/2017 | Laarakkers | H04L 63/101 |
| 2017/0169227 A1* | 6/2017 | Rajcan | G06F 9/4416 |
| 2017/0169234 A1* | 6/2017 | Camiel | H04L 67/1097 |
| 2017/0171752 A1* | 6/2017 | Lee | H04W 76/12 |
| 2017/0195339 A1* | 7/2017 | Brown | H04W 4/80 |
| 2017/0201518 A1* | 7/2017 | Holmqvist | H04L 63/10 |
| 2017/0201588 A1* | 7/2017 | Schmidt | H04L 63/105 |
| 2017/0223046 A1 | 8/2017 | Singh | |
| 2017/0235848 A1* | 8/2017 | Van Dusen | G06Q 10/101 705/12 |
| 2017/0257363 A1* | 9/2017 | Franke | H04W 12/069 |
| 2017/0272316 A1* | 9/2017 | Johnson | H04L 61/301 |
| 2017/0277678 A1* | 9/2017 | Ganim | G06F 16/93 |
| 2017/0289191 A1 | 10/2017 | Thioux et al. | |
| 2017/0302642 A1 | 10/2017 | Hindocha | |
| 2017/0308395 A1* | 10/2017 | Cook | H04L 45/64 |
| 2017/0317740 A1* | 11/2017 | Basu Mallick | H04W 8/005 |
| 2017/0324714 A1* | 11/2017 | Wainner | H04L 63/0272 |
| 2017/0339564 A1* | 11/2017 | Momchilov | H04L 63/107 |
| 2017/0353496 A1* | 12/2017 | Pai | H04L 63/10 |
| 2017/0364450 A1* | 12/2017 | Struttmann | H04L 9/3297 |
| 2018/0007059 A1* | 1/2018 | Innes | G06F 21/6218 |
| 2018/0013568 A1* | 1/2018 | Muhanna | H04L 9/0822 |
| 2018/0020005 A1 | 1/2018 | Beiter et al. | |
| 2018/0034822 A1* | 2/2018 | Mistry | H04W 12/37 |
| 2018/0041479 A1* | 2/2018 | Wang | H04L 63/0838 |
| 2018/0061112 A1* | 3/2018 | Richards | G06T 15/06 |
| 2018/0063126 A1* | 3/2018 | Karapantelakis | G06Q 20/40 |
| 2018/0063152 A1* | 3/2018 | Erich | H04L 63/0861 |
| 2018/0069865 A1* | 3/2018 | Rieke | H04L 41/5058 |
| 2018/0077243 A1* | 3/2018 | Mathew | H04L 67/143 |
| 2018/0115554 A1* | 4/2018 | Dyon | H04L 63/164 |
| 2018/0139238 A1* | 5/2018 | Schultz | H04L 63/0272 |
| 2018/0159856 A1* | 6/2018 | Gujarathi | H04L 63/0281 |
| 2018/0198824 A1* | 7/2018 | Pulapaka | H04L 41/5025 |
| 2018/0219849 A1* | 8/2018 | Jones | H04L 41/046 |
| 2018/0227296 A1* | 8/2018 | Joshi | H04W 12/06 |
| 2018/0248692 A1* | 8/2018 | Henderson | H04L 9/0861 |
| 2018/0248973 A1* | 8/2018 | Cook | H04L 63/08 |
| 2018/0255591 A1* | 9/2018 | Valicherla | H04L 12/4641 |
| 2018/0262388 A1* | 9/2018 | Johnson | H04L 63/0823 |
| 2018/0279407 A1* | 9/2018 | Xu | H04W 76/10 |
| 2018/0295137 A1* | 10/2018 | Zager | H04L 63/0861 |
| 2018/0302419 A1* | 10/2018 | Niemela | G06F 16/2255 |
| 2018/0302448 A1* | 10/2018 | Nandoori | H04L 65/1069 |
| 2018/0308202 A1* | 10/2018 | Appu | G06T 1/20 |
| 2018/0322183 A1 | 11/2018 | Feijoo | |
| 2018/0324172 A1* | 11/2018 | Unnikrishnan | H04L 63/102 |
| 2018/0324173 A1* | 11/2018 | Ananthapur Bache | H04L 63/0815 |
| 2018/0350180 A1* | 12/2018 | Onischuk | G07C 13/00 |
| 2018/0359237 A1 | 12/2018 | Shem Tov et al. | |
| 2018/0359259 A1* | 12/2018 | Leon | G06F 9/445 |
| 2018/0365259 A1* | 12/2018 | Blaicher | G06F 11/3068 |
| 2018/0367569 A1* | 12/2018 | Verma | H04L 63/0263 |
| 2018/0367570 A1* | 12/2018 | Verma | H04W 12/48 |
| 2018/0367571 A1* | 12/2018 | Verma | H04L 63/0263 |
| 2018/0367574 A1* | 12/2018 | Verma | H04L 63/20 |
| 2018/0367578 A1* | 12/2018 | Verma | H04W 24/08 |
| 2019/0007216 A1* | 1/2019 | Meriac | G06F 21/572 |
| 2019/0007409 A1* | 1/2019 | Totale | H04L 9/3228 |
| 2019/0014181 A1 | 1/2019 | Ramasamy et al. | |
| 2019/0018719 A1 | 1/2019 | Brin | |
| 2019/0020484 A1* | 1/2019 | Boeckeler | H04L 9/3247 |

(56) References Cited

U.S. PATENT DOCUMENTS

| | | | |
|---|---|---|---|
| 2019/0036853 A1 | 1/2019 | Denoue et al. | |
| 2019/0068373 A1* | 2/2019 | Konduru | H04L 63/0853 |
| 2019/0068617 A1* | 2/2019 | Coleman | H04L 63/0876 |
| 2019/0075099 A1* | 3/2019 | Brouchier | H04L 9/0861 |
| 2019/0097970 A1* | 3/2019 | Coleman | H04L 63/0236 |
| 2019/0097972 A1* | 3/2019 | Coleman | H04L 63/0272 |
| 2019/0104415 A1* | 4/2019 | Gehrmann | H04W 12/08 |
| 2019/0121827 A1* | 4/2019 | Boswell | G06F 40/143 |
| 2019/0121962 A1* | 4/2019 | Coleman | H04L 63/083 |
| 2019/0132299 A1* | 5/2019 | Tucker | H04W 12/0431 |
| 2019/0149539 A1* | 5/2019 | Scruby | H04L 63/0838 713/168 |
| 2019/0158353 A1* | 5/2019 | Johnson | G06F 16/95 |
| 2019/0199803 A1* | 6/2019 | Murray | H04L 67/141 |
| 2019/0207963 A1* | 7/2019 | Lord | H04L 63/1425 |
| 2019/0222439 A1* | 7/2019 | Zhu | H04L 63/029 |
| 2019/0222577 A1* | 7/2019 | Eliyahu | H04L 63/102 |
| 2019/0223012 A1* | 7/2019 | Yu | H04W 12/08 |
| 2019/0239081 A1* | 8/2019 | Zhu | H04L 9/40 |
| 2019/0245848 A1* | 8/2019 | Divoux | H04L 63/0815 |
| 2019/0261222 A1* | 8/2019 | Raleigh | H04L 12/1407 |
| 2019/0289013 A1* | 9/2019 | Makmel | H04L 63/0876 |
| 2019/0311134 A1 | 10/2019 | Mahaffey et al. | |
| 2019/0318114 A1 | 10/2019 | Holt et al. | |
| 2019/0319794 A1* | 10/2019 | Haldar | H04L 9/3236 |
| 2019/0327227 A1* | 10/2019 | Tobkes | H04L 67/52 |
| 2019/0340376 A1* | 11/2019 | Fleck | H04L 67/5683 |
| 2019/0349338 A1* | 11/2019 | Frost | G06F 9/452 |
| 2019/0349406 A1* | 11/2019 | Pan | H04L 63/205 |
| 2019/0361694 A1 | 11/2019 | Gordon et al. | |
| 2019/0364418 A1* | 11/2019 | Singh | H04W 8/24 |
| 2019/0373447 A1* | 12/2019 | Chughtai | H04M 15/8043 |
| 2019/0387408 A1* | 12/2019 | Yang | H04W 12/71 |
| 2019/0391712 A1* | 12/2019 | Singh | G06F 9/54 |
| 2020/0004946 A1* | 1/2020 | Gilpin | H04L 9/50 |
| 2020/0021591 A1* | 1/2020 | Hecht | H04L 63/10 |
| 2020/0036699 A1* | 1/2020 | Suresh | H04L 63/083 |
| 2020/0050686 A1* | 2/2020 | Kamalapuram | H04L 67/10 |
| 2020/0050749 A1* | 2/2020 | Barboi | H04L 63/0853 |
| 2020/0052889 A1* | 2/2020 | Bendersky | H04L 9/0861 |
| 2020/0053096 A1* | 2/2020 | Bendersky | G06F 21/32 |
| 2020/0059512 A1* | 2/2020 | Ajodha | H04L 67/10 |
| 2020/0076823 A1* | 3/2020 | Coonrod | H04L 63/107 |
| 2020/0076902 A1* | 3/2020 | Huang | H04L 63/0281 |
| 2020/0089898 A1* | 3/2020 | Borkar | G06F 21/44 |
| 2020/0099738 A1* | 3/2020 | Borkar | H04L 67/63 |
| 2020/0106760 A1* | 4/2020 | Chauhan | G06F 21/6218 |
| 2020/0112589 A1* | 4/2020 | Chauhan | H04W 12/02 |
| 2020/0120142 A1* | 4/2020 | Maynard | G06Q 10/067 |
| 2020/0137062 A1* | 4/2020 | Rao | H04W 4/20 |
| 2020/0145425 A1* | 5/2020 | Chauhan | H04L 63/107 |
| 2020/0145515 A1* | 5/2020 | Fleck | H04L 63/1441 |
| 2020/0151348 A1* | 5/2020 | Chauhan | H04L 67/53 |
| 2020/0153818 A1* | 5/2020 | Chauhan | H04L 63/20 |
| 2020/0153920 A1* | 5/2020 | Chauhan | H04L 67/55 |
| 2020/0153928 A1* | 5/2020 | Chauhan | H04L 67/568 |
| 2020/0162359 A1* | 5/2020 | Borkar | H04L 43/50 |
| 2020/0162454 A1* | 5/2020 | Jain | H04L 63/0815 |
| 2020/0162471 A1* | 5/2020 | Borkar | H04L 63/102 |
| 2020/0162898 A1* | 5/2020 | Nair | H04W 12/082 |
| 2020/0177564 A1* | 6/2020 | Arisankala | H04L 9/0861 |
| 2020/0177639 A1* | 6/2020 | Cui | G06F 9/45558 |
| 2020/0178076 A1* | 6/2020 | Ben Henda | H04W 12/0471 |
| 2020/0186518 A1* | 6/2020 | Shah | H04L 63/0815 |
| 2020/0186526 A1* | 6/2020 | Li | H04L 63/102 |
| 2020/0193044 A1* | 6/2020 | Dyvadheenam | H04L 67/568 |
| 2020/0213355 A1* | 7/2020 | Ogan | H04L 63/1466 |
| 2020/0228975 A1* | 7/2020 | Li | H04W 28/0268 |
| 2020/0228987 A1* | 7/2020 | Ben Henda | H04W 12/106 |
| 2020/0235935 A1* | 7/2020 | Cerna, Jr. | H04L 9/3236 |
| 2020/0244728 A1* | 7/2020 | Jha | H04L 9/30 |
| 2020/0285499 A1* | 9/2020 | Heller | H04L 63/08 |
| 2020/0285777 A1* | 9/2020 | Heller | G06F 12/1483 |
| 2020/0293352 A1 | 9/2020 | Foley | |
| 2020/0304484 A1* | 9/2020 | Lakunishok | G06F 21/62 |
| 2020/0314104 A1* | 10/2020 | Achyuth | G06F 21/32 |
| 2020/0314133 A1* | 10/2020 | Singh | G06F 21/604 |
| 2020/0314167 A1* | 10/2020 | Achyuth | H04L 63/107 |
| 2020/0322327 A1 | 10/2020 | Suresh et al. | |
| 2020/0329072 A1* | 10/2020 | Dubois | H04L 63/102 |
| 2020/0334698 A1 | 10/2020 | Magazine et al. | |
| 2020/0336904 A1* | 10/2020 | Maleknejad | H04W 12/106 |
| 2020/0371822 A1 | 11/2020 | Zhou et al. | |
| 2020/0371995 A1* | 11/2020 | Padmanabhan | H04L 9/0894 |
| 2020/0374284 A1* | 11/2020 | Suresh | H04L 63/0861 |
| 2020/0374324 A1* | 11/2020 | Le Strat | H04L 12/1822 |
| 2020/0412576 A1* | 12/2020 | Kondapavuluru | H04L 63/0435 |
| 2020/0412731 A1* | 12/2020 | Gulbrandsen | H04L 9/3247 |
| 2021/0014317 A1 | 1/2021 | Lv et al. | |
| 2021/0021605 A1* | 1/2021 | Innes | H04L 63/104 |
| 2021/0027743 A1 | 1/2021 | Lee et al. | |
| 2021/0037015 A1* | 2/2021 | Deora | H04L 63/0861 |
| 2021/0049600 A1* | 2/2021 | Spector | H04L 9/085 |
| 2021/0092054 A1* | 3/2021 | Kondapavuluru | H04L 45/74 |
| 2021/0092136 A1 | 3/2021 | Woodworth et al. | |
| 2021/0092597 A1* | 3/2021 | Sharma | H04W 36/00692 |
| 2021/0099451 A1* | 4/2021 | Will | H04L 63/101 |
| 2021/0099553 A1 | 4/2021 | Grosjean et al. | |
| 2021/0136084 A1* | 5/2021 | Dayan | H04L 63/08 |
| 2021/0136101 A1 | 5/2021 | Ben-Yosef et al. | |
| 2021/0160262 A1 | 5/2021 | Bynum et al. | |
| 2021/0184966 A1* | 6/2021 | Ramaswamy | H04L 45/74 |
| 2021/0194888 A1* | 6/2021 | Bhaskar S | G06F 16/3347 |
| 2021/0194911 A1* | 6/2021 | Hecht | H04L 63/1433 |
| 2021/0194913 A1* | 6/2021 | Hecht | H04L 63/105 |
| 2021/0218770 A1 | 7/2021 | Ben-Yosef et al. | |
| 2021/0232673 A1* | 7/2021 | Athlur | G06F 21/82 |
| 2021/0232693 A1* | 7/2021 | Leenstra | G06F 9/45558 |
| 2021/0243027 A1 | 8/2021 | Gupta | |
| 2021/0243028 A1* | 8/2021 | Song | H04L 9/3228 |
| 2021/0243193 A1* | 8/2021 | Padmanabhan | G06F 16/252 |
| 2021/0248053 A1* | 8/2021 | Wei | G06F 11/3404 |
| 2021/0258308 A1* | 8/2021 | Avetisov | H04L 9/0825 |
| 2021/0258316 A1* | 8/2021 | Liu | H04L 63/0876 |
| 2021/0258381 A1* | 8/2021 | Martini | G06F 9/45533 |
| 2021/0273923 A1* | 9/2021 | Zhang | H04L 63/0428 |
| 2021/0274346 A1* | 9/2021 | Suh | H04L 63/205 |
| 2021/0288973 A1* | 9/2021 | Dimble | H04W 12/108 |
| 2021/0306331 A1* | 9/2021 | Gadwale | H04L 63/18 |
| 2021/0329021 A1* | 10/2021 | Shaw | H04L 63/20 |
| 2021/0329032 A1* | 10/2021 | Shaw | H04L 63/1425 |
| 2021/0336944 A1 | 10/2021 | Brinckman et al. | |
| 2021/0336947 A1* | 10/2021 | Rubin | H04L 63/14 |
| 2021/0337013 A1 | 10/2021 | Krishnamurthy et al. | |
| 2021/0350064 A1* | 11/2021 | Freundlich | G06F 16/383 |
| 2021/0352069 A1* | 11/2021 | Momchilov | G06F 21/32 |
| 2021/0352106 A1* | 11/2021 | Luo | H04L 63/0823 |
| 2021/0370705 A1* | 12/2021 | Rizzolo | B42D 25/305 |
| 2021/0385191 A1* | 12/2021 | Ferguson | H04L 69/26 |
| 2022/0007191 A1* | 1/2022 | Shaw | H04W 28/09 |
| 2022/0007195 A1* | 1/2022 | Shaw | H04L 63/104 |
| 2022/0038282 A1* | 2/2022 | Teramoto | H04L 9/0894 |
| 2022/0038442 A1* | 2/2022 | Lev | G06F 21/31 |
| 2022/0039178 A1* | 2/2022 | Salkintzis | H04W 12/041 |
| 2022/0050828 A1 | 2/2022 | Wu et al. | |
| 2022/0060446 A1* | 2/2022 | Dalvi | H04L 63/0236 |
| 2022/0066798 A1 | 3/2022 | Kelly et al. | |
| 2022/0094547 A1* | 3/2022 | Duchastel | H04L 63/0807 |
| 2022/0095158 A1* | 3/2022 | De kievit | H04L 1/0002 |
| 2022/0116345 A1* | 4/2022 | Xu | H04L 67/141 |
| 2022/0158992 A1* | 5/2022 | Bendersky | H04L 63/029 |
| 2022/0286303 A1* | 9/2022 | Woo | G09C 1/00 |
| 2022/0321362 A1* | 10/2022 | Konda | G06F 21/57 |
| 2022/0351357 A1* | 11/2022 | Waldron | G08B 5/22 |
| 2022/0352983 A1* | 11/2022 | Nyamwange | G06Q 20/223 |
| 2022/0360981 A1* | 11/2022 | Hessler | H04W 12/71 |
| 2023/0014269 A1* | 1/2023 | Sherker | H04W 12/08 |
| 2023/0054961 A1* | 2/2023 | Ramaswamy | H04L 47/22 |
| 2023/0095715 A1* | 3/2023 | Srivastava | H04W 72/04 726/23 |
| 2023/0121852 A1* | 4/2023 | Yan | H04L 9/3268 713/153 |
| 2023/0123524 A1* | 4/2023 | Bendersky | H04L 63/10 726/4 |

(56) References Cited

U.S. PATENT DOCUMENTS

| | | | | |
|---|---|---|---|---|
| 2023/0164058 | A1* | 5/2023 | Xiang | H04L 45/02 370/254 |
| 2023/0216940 | A1* | 7/2023 | Parthasarathy | H04L 45/48 |
| 2023/0269589 | A1* | 8/2023 | Baskaran | H04W 12/037 726/6 |
| 2023/0275837 | A1* | 8/2023 | Parla | H04L 67/148 370/230 |
| 2023/0327949 | A1* | 10/2023 | Singh | H04L 67/34 709/221 |
| 2024/0031412 | A1* | 1/2024 | Sonoda | G06F 21/57 |
| 2024/0037264 | A1* | 2/2024 | Tran | H04L 9/0643 |
| 2024/0119534 | A1* | 4/2024 | Kloeppel | G06Q 20/3821 |
| 2024/0152690 | A1* | 5/2024 | Wei | G06F 3/04845 |
| 2024/0214356 | A1* | 6/2024 | Wang | H04L 63/029 |
| 2024/0236214 | A1* | 7/2024 | Eastlake, III | H04L 45/74 |
| 2024/0259290 | A1* | 8/2024 | Chen | H04L 45/123 |
| 2024/0388533 | A1* | 11/2024 | Parla | H04L 65/1045 |

OTHER PUBLICATIONS

Cholia et al "NEWT: A RESTful Service for Building High Performance Computing Web Applications," IEEE, pp. 1-11, (Year: 2011).*

Sharma et al Network Performance Evaluation of VPN Protocols (SSTP and IKEv2), IEEE, pp. 1-5 (Year: 2016).*

Han et al "The Design of Secure Embedded VPN Gateway," 2014 IEEE Workshop on Advanced Research and Technology in Industry Applications (WARTIA), pp. 350-353 (Year: 2014).*

Kappes et al "Multitenant Access Control for Cloud-Aware Distributed Filesystems," IEEE Transactions on Dependable and Secure Computing, IEEE, pp. 1070-1085 (Year: 2019).*

Alshalan et al "A Survey of Mobile VPN Technologies," IEEE Communications Surveys & Tutorials, pp. 1177-1196 (Year: 2016).*

Communication and Search Report issued by the European Patent Office in Application No. 21186783.3-1213, dated Jan. 24, 2022 (10 pages).

Homeland Security "Configuring and Managing Remote Access for Industrial Control Systems", Control Systems Security Program, National Cyber Security Division, CPNI, Centre for Protection of National Infrastructure, Nov. 2010, pp. 1-66 (2010).

Sharma, "Remote System Controller: An Implementation of a Secure Channel", International Journal of Computer Science and Mobile Computing, A Journal of Computer Science and Information Technology, IJCS, vol. 2, Issue 4, Apr. 2013, pp. 414-421 (2013).

Montoro, "Remote Desktop Protocol, the Good, the Bad, and the Ugly", Security Advisory, May 28, 2005, pp. 1-4 (2005).

Mogica "Remote Desktop: Integrating Mulitple Devices," Thesis, Stockholm Sweden, Nov. 29, 2008, pp. 1-44 (2008).

* cited by examiner

NATIVE REMOTE ACCESS TO TARGET RESOURCES USING SECRETLESS CONNECTIONS

CROSS-REFERENCE TO RELATED APPLICATIONS

This application is a continuation of U.S. patent application Ser. No. 17/097,809, filed on Nov. 13, 2020. The aforementioned application is incorporated herein by reference in its entirety.

BACKGROUND

Organizations and individuals increasingly use remote network connections for accessing secure files and other network resources. For example, many organizations allow individuals to work collaboratively from different offices, from home office locations, or while travelling. As another example, individuals may use cloud-based servers for storing electronic files and may access these files through a remote connection. Thus, these remote connections provide improved flexibility, allowing users to access a network remotely as if their device was connected to the network directly. Although advantageous, these remote connections may present security vulnerabilities and are common targets for malicious actors to gain access to the secure network or user data.

Some existing techniques, such as virtual private networks (VPNs), require the installation of VPN clients, which can be cumbersome for users and often lead to increased operating expenditures for organizations. Further, VPNs often do not discriminate among target resources, and instead provide users with full access to the network. For this reason, VPN clients are common attack points for malicious users, who may target security vulnerabilities to gain access to secure networks and harvest user credentials or other sensitive data. Further, such VPN clients often require users to enter passwords specific to the VPN service, which increases the risk of credentials theft and deteriorates the user's experience. Other techniques, such as HTML5 gateway solutions, do not require the installation of VPN clients, but equally provide a poor user experience by requiring a browser-based session, rather than a native desktop client.

Some remote desktop gateway techniques allow for passwordless or multi-factor authentication, however, additional passwords may be required to access a particular target resource. Further, these remote desktop gateways often require a user to identify details of a target server (such as IP addresses, or port configurations), a domain username, or other sensitive information, which may create an attack vector for malicious actors.

Accordingly, in view of these and other deficiencies in existing techniques, technological solutions are needed for securely establishing passwordless and native remote access sessions. In particular, solutions should advantageously allow for the sessions to be established without requiring separate credentials. Further, technological solutions should allow native access without requiring a dedicated remote access client or other non-native software, such as a web-based interface. Solutions should also be dynamic, allowing secure connections to be established during a connection phase, without potentially exposing sensitive client information, such as usernames or other credentials, or sensitive target details, such as IP addresses or other information for the target host.

SUMMARY

The disclosed embodiments describe non-transitory computer readable media, systems, and methods for securely establishing secretless and remote native access sessions. For example, in an embodiment, a non-transitory computer readable medium may include instructions that, when executed by at least one processor, cause the at least one processor to perform operations for securely establishing secretless and remote native access sessions. The operations may comprise identifying a client configured to participate in remote native access sessions, wherein the client has a remote access protocol file that has been modified to include an identifier associated with the client; sending a prompt to the client to establish a secure tunnel connection with a connection agent using the identifier associated with the client; authenticating the client; accessing target identity information associated with one or more target resources; receiving from the client a token that identifies a target resource from among the one or more target resources; obtaining, based on the token, a credential required for secure access to the target resource; and initiating, using the credential, a remote native access session between the client and the target resource.

According to a disclosed embodiment, the remote access protocol file may be modified by the client.

According to a disclosed embodiment, the connection agent may replace a username in a request for the remote native access session with data from the token.

According to a disclosed embodiment, the credential may be obtained in a secretless manner from the perspective of the client.

According to a disclosed embodiment, the target identity information may be associated with a plurality of target resources.

According to a disclosed embodiment, the operations may further comprise receiving a selection by the client of the target resource from among the plurality of target resources.

According to a disclosed embodiment, the plurality of target resources may be identified based on access rights of the client.

According to a disclosed embodiment, the plurality of target resources may be identified based on the authentication of the client.

According to a disclosed embodiment, the remote access protocol file may be a remote desktop protocol.

According to a disclosed embodiment, the identifier associated with the client may be at least one of: a mobile telephone number, and email address, a user name, an account name, or a custom identifier created by the client.

According to another disclosed embodiment, there may be a computer-implemented method for securely establishing secretless and remote native access sessions. The method may comprise identifying a client configured to participate in remote native access sessions, wherein the client has a remote access protocol file that has been modified to include an identifier associated with the client; sending a prompt to the client to establish a secure tunnel connection with a connection agent using the identifier associated with the client; authenticating the client; accessing target identity information associated with one or more target resources; receiving from the client a token that identifies a target resource from among the one or more target resources;

obtaining, based on the token, a credential required for secure access to the target resource; and initiating, using the credential, a remote native access session between the client and the target resource.

According to a disclosed embodiment, the credential may be obtained from a secure credentials vault.

According to a disclosed embodiment, the credential may be obtained without making the credential available to the client.

According to a disclosed embodiment, the credential may be obtained locally at the client, and deleted at the client upon termination of the remote native access session.

According to a disclosed embodiment, the target identity information may be associated a plurality of target resources.

According to a disclosed embodiment, the method may further comprise sending to the client data for generating a selectable menu of the plurality of target resources.

According to a disclosed embodiment, the selectable menu of the plurality of target resources may comprise icons and identifying data associated with the plurality of target resources.

According to a disclosed embodiment, the authentication of the client may be performed according to at least one of: OpenID or Security Assertion Markup Language.

According to a disclosed embodiment, the connection agent may be located in a local network in which the target resource is also located.

According to a disclosed embodiment, the connection agent may be located in a virtualized network in which the target resource is also located.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
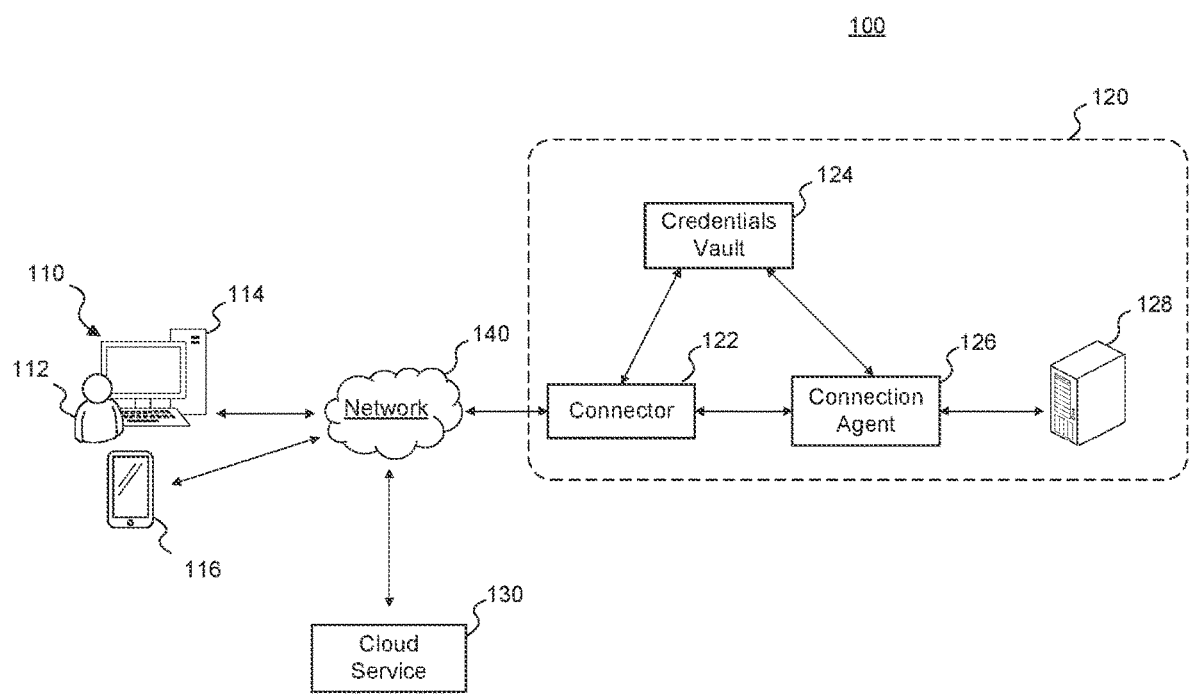
FIG. 1 illustrates an example system environment for providing native remote access to target resources, consistent with the disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for securely establishing secretless and remote native access sessions described herein overcome several technological problems relating to security, efficiency, and functionality in the fields of cybersecurity and remote network access. In particular, the disclosed embodiments provide techniques for establishing secure remote access sessions in a passwordless manner using native desktop clients. As discussed above, many current remote access techniques present security vulnerabilities and inefficiencies both for users and for organizations. For example, virtual private networks (VPNs) and other connections often create attack vectors for malicious actors. In particular, VPN and other clients often use credentials, such as passwords, when establishing the connection, which may unnecessarily expose these credentials to attackers. Similarly, some techniques include sensitive information about the client or the host network in communications establishing the connection, which may also create vulnerabilities. Further, VPN clients and other techniques often allow broad access to a network, which may increase the ability of attackers to access sensitive information or escalate privileges in the network.

The disclosed embodiments provide technical solutions to these and other problems with current techniques. In particular, the disclosed techniques do not require passwords or other credentials to be stored on the client device, or to be transmitted by the client to the target network system, thereby improving security in the network. Further, the disclosed techniques allow a remote access session to be established without identifying a particular target resource and without transmitting usernames or other sensitive information associated with the client during the connection phase. Rather, this information may be provided after the connection has been established and once a user has been authenticated. Moreover, the scope of access that a user may be granted can be narrowly tailored based on permissions associated with the user or the current access requirements of the user. For these, and other reasons that will be apparent to those skilled in the art, the disclosed techniques provide improved security over existing techniques.

Further, the disclosed techniques do not require a dedicated agent or client to be installed on a client device for establishing the secure connection other than software components that are native to the device and/or the operating system. For example, the remote access may be established using a standard remote desktop protocol, without the need for a VPN client, a web-based portal, or other non-native software. This not only improves the experience for the user, but can provide increased flexibility in the types of devices that can access the network, and can also reduce overhead costs associated with maintenance and troubleshooting of a dedicated client.

Reference will now be made in detail to the disclosed embodiments, examples of which are illustrated in the accompanying drawings.

FIG. 1 illustrates an example system environment 100 for providing native remote access to target resources, consistent with the disclosed embodiments. System environment 100 may include one or more client identities 110, one or more mobile devices 116, a client system 120, and one or more cloud services 130, as shown in FIG. 1. Client system 120 may comprise, among other things, a connector 122, a credentials vault 124, a connection agent 126, and one or more target resources 128. System environment 100 may represent a system or network environment in which client identity 110 requests access to target resource 128 remotely. System environment 100 may be configured to provide client identity 110 access to target resource 128 using native web applications (i.e., without requiring a dedicated application, webpage, etc.) and without requiring separate credentials. Further details regarding this system are provided below.

The various components of system 100 may communicate over a network 140. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system environment 100 is shown as a network-based environment, it is understood that in some embodiments, one or more aspects of the disclosed systems and methods may also be used in a localized system, with one or more of the components communicating directly with each other.

Client identity 110 may refer to any identity that may access files associated with target resource 128. In some embodiments, client identity 110 may refer to a particular user or account (e.g., data and/or instructions representing an individual or service account). For example, client identity 110 may include a user 112 associated with one or more credentials for accessing target resource 128. In some embodiments, client identity 110 may include a client device 114 through which user 112 may access target resource 128. For example, client device 114 may be a personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may engage in remote access to target resource 128. In some embodiments, client identity 110 may be a virtual machine (e.g., based on AWS™, Azure™, IBM Cloud™, etc.), container instance (e.g., Docker™ container, Java™ container, Windows Server™ container, etc.), or other virtualized instance. In some embodiments, client identity 110 may be a software instance or application executing on client device 114. Using the disclosed methods, client identity 110 may access target resource 128 remotely without the need for specific credentials, a VPN, a dedicated agent, etc. As used herein, a "client" may refer collectively to client identity 110, to user 112, an account associated with user 112, or to client device 114.

In some embodiments, client identity 110 may be authorized through system environment 100 using a multi-factor authentication process. This may include authenticating client identity 110, at least in part, through verifying an object in the possession of user 112. Accordingly, system environment 100 may further include a device, such as mobile device 116, for authenticating client identity 110. Mobile device 116 may include any computing device associated with user 112 that is separate from client device 114. For example, mobile device 116 may include a mobile phone, a tablet, a wearable device (e.g., a smart watch, smart jewelry, implantable device, fitness tracker, smart clothing, head-mounted display, etc.). In some embodiments, mobile device 116 may be configured to receive push notifications or other electronic communications requesting authentication of client identity 110. Further, mobile device 116 may include a display configured to display graphical user interfaces for selecting accounts and/or target resources, or performing other functions associated with the disclosed techniques.

Client identity 110 and/or mobile device 116 may communicate with client system 120 through network 140. Client identity 110 may be configured to participate in remote native access sessions with client system 120 for accessing target resource 128. As used herein, a remote native access session may refer to any network-based remote connection that is accessed through native software and components of the client device 114. In some embodiments, the remote native access session may be a remote desktop connection. Accordingly, the native software may include a remote desktop client that is not specific to client system 120 or cloud service 130. For example, the remote desktop client may include a client integral to an operating system of client device 114, such as a Microsoft™ remote desktop protocol (RDP) client, or similar RDP clients. Accordingly, the remote native access session may be accessed without the need for a dedicated client (e.g., a VPN client), a webpage browser (e.g., through a web portal, an HTML5 gateway, etc.), or the like.

Further, the remote native access session may be dynamic. As used herein, a dynamic connection may be one that is established without initially identifying one or more aspects of the remote access connection. For example, during the connection phase, the account accessing the connection, the target resource (e.g., the target IP address, etc.), the connecting tool (e.g., which application is used), or various other aspects may not be defined. Rather, these or other aspects may be defined after the connection has been established, and potentially after the client identity has been authenticated. In some embodiments, user 112 may specify these aspects over the native connection using client device 114, mobile device 116, or through other methods. Additional details regarding the remote native access session are described below with respect to FIG. 3.

As shown in FIG. 1, client system 120 may include a connector 122. Connector 122 may be a component of client system 120 responsible for receiving requests for remote access sessions. Connector 122 may process these requests and perform additional interfacing steps between client device 114, mobile device 116, cloud service 130, and/or components of client system 120. Connector 122 may be a dedicated server, service, or software component of client system 120, or may be integrated with one or more other components of client system 120.

In some embodiments, client system 120 may further include, or have external access to, a credentials vault 124.

Credentials vault 124 may be any form of storage location containing credentials (such as usernames, tokens, passwords, etc.) associated with client system 120 (e.g., CyberArk Enterprise Password Vault™). In particular, credentials vault 124 may store credentials required to access target resource 128. For example, as discussed further below, in situations where client identity 110 has been successfully authenticated, connector 122 and/or connection agent 126 may fetch a secret (e.g., authentication key, credential, token, password, etc.) from credentials vault 124 for authentication of client identity 110 (or a corresponding identity or account) to the appropriate target resource 128. In some embodiments the secrets stored within credentials vault 124 may not be provided to client identity 110. Accordingly, user 112 may be authenticated in a passwordless manner to access target resource 128. In some embodiments, credentials vault 124 may be omitted and the credentials may be stored locally in client system 120, on client device 114 or mobile device 116.

Client system 120 may further include a connection agent 126, as shown in FIG. 1. Connection agent 126 may be a separate component (e.g., a separate software component, a separate server, etc.) or may be integrated with one or more other components of client system 120, such as connector 122. Connection agent 126 may perform tasks associated with establishing a remote access session as described above. Connection agent 126 may further obtain credentials for client identity 110, for example through credentials vault 124. Additional details regarding these and other actions that may be performed by connection agent 126 are provided below with respect to FIG. 3.

Client system 120 may further include, or have external access to, a target resource 128. As used herein, a target resource may refer to any resource within a network that may accessed by client system 120 remotely. Examples of network resources may include SQL servers, databases or data structures holding confidential information, restricted-use applications, operating system directory services, access-restricted cloud-computing resources (e.g., an AWS™ or Azure™ server), sensitive IoT equipment (e.g., physical access control devices, video surveillance equipment, etc.), and/or any other computer-based equipment or software that may be accessible over a network.

In some embodiments, target resource 128 may be a privileged resource, such that access may be limited or restricted. For example, access to the requested resource may require a privileged credential (e.g., a password, a username, an SSH key, an asymmetric key, a security or access token, etc.), membership in a privileged access group (e.g., Microsoft Active Directory™ group, AWS Identity and Access Management™ group, etc.), or other form of privileged access rights. In some embodiments, credentials vault 124 may store privileged credentials required for accessing target resource 128, as described above.

In some embodiments, system environment 100 may include a cloud service 130, as shown in FIG. 1. Cloud service 130 may be a cloud-based service configured to perform tasks associated with facilitating the connection between client device 114 (and/or mobile device 116) and client system 120. For example, cloud service 130 may be configured to receive or intercept access requests from client device 114 and may route them to connector 122. Additional details regarding these and other actions that may be performed by service 130 are described below with respect to FIG. 3.

Figure 2:
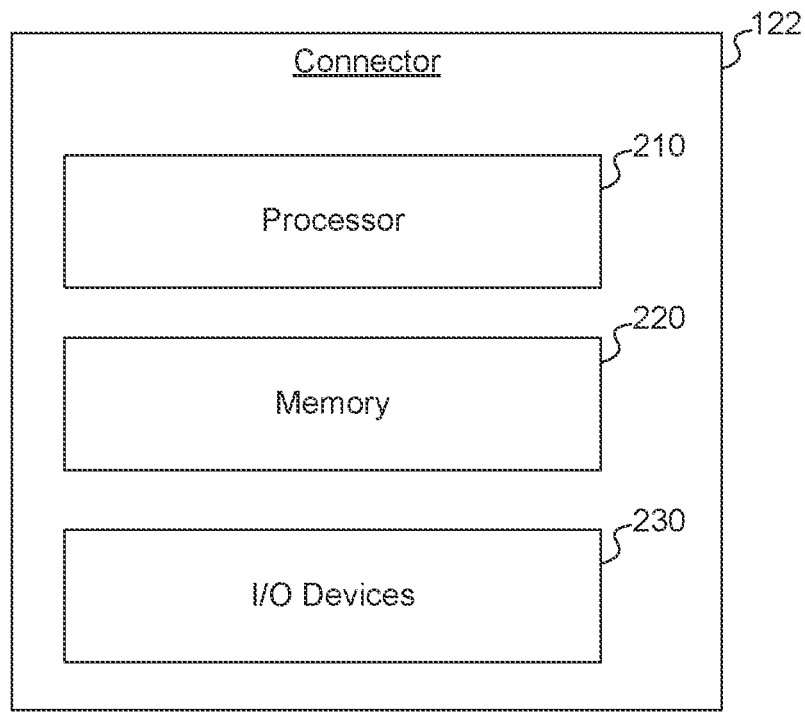
FIG. 2 is a block diagram showing an example computing system, consistent with the disclosed embodiments.

FIG. 2 is a block diagram showing an example connector 122, consistent with the disclosed embodiments. As described above, connector 122 may be a computing device (e.g., a server, etc.) and may include one or more dedicated processors and/or memories. For example, connector 122 may include a processor (or multiple processors) 210, a memory (or multiple memories) 220, and/or one or more input/output (I/O) devices 230, as shown in FIG. 2. In some embodiments, connector 122 may be integrated with one or more other components of client system 120. For example, processor 210 and/or memory 220 may also be associated with credentials vault 124, connection agent 126, and/or target resource 128.

Processor 210 may take the form of, but is not limited to, a microprocessor, embedded processor, or the like, or may be integrated in a system on a chip (SoC). Furthermore, according to some embodiments, processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. The disclosed embodiments are not limited to any type of processor configured in client system 120.

Memory 220 may include one or more storage devices configured to store instructions used by the processor 210 to perform functions related to client system 120. The disclosed embodiments are not limited to particular software programs or devices configured to perform dedicated tasks. For example, the memory 220 may store a single program, such as a user-level application, that performs the functions associated with the disclosed embodiments, or may comprise multiple software programs. Additionally, the processor 210 may, in some embodiments, execute one or more programs (or portions thereof) remotely located from connector 122. Furthermore, memory 220 may include one or more storage devices configured to store data for use by the programs. Memory 220 may include, but is not limited to a hard drive, a solid state drive, a CD-ROM drive, a peripheral storage device (e.g., an external hard drive, a USB drive, etc.), a database, a network drive, a cloud storage device, or any other storage device.

I/O devices 230 may include one or more network adaptors or communication devices and/or interfaces (e.g., WIFI, BLUETOOTH, RFID, NFC, RF, infrared, Ethernet, etc.) to communicate with other machines and devices, such as with other components of system environment 100 through network 140. For example, client system 120 may use a network adaptor to receive and transmit communications pertaining to access requests within system environment 100. In some embodiments, I/O devices 230 may also include interface devices for interfacing with a user of client system 120. For example, I/O devices 230 may comprise a display, touchscreen, keyboard, mouse, trackball, touch pad, stylus, printer, or the like, configured to allow a user to interact with client system 120.

Figure 3:
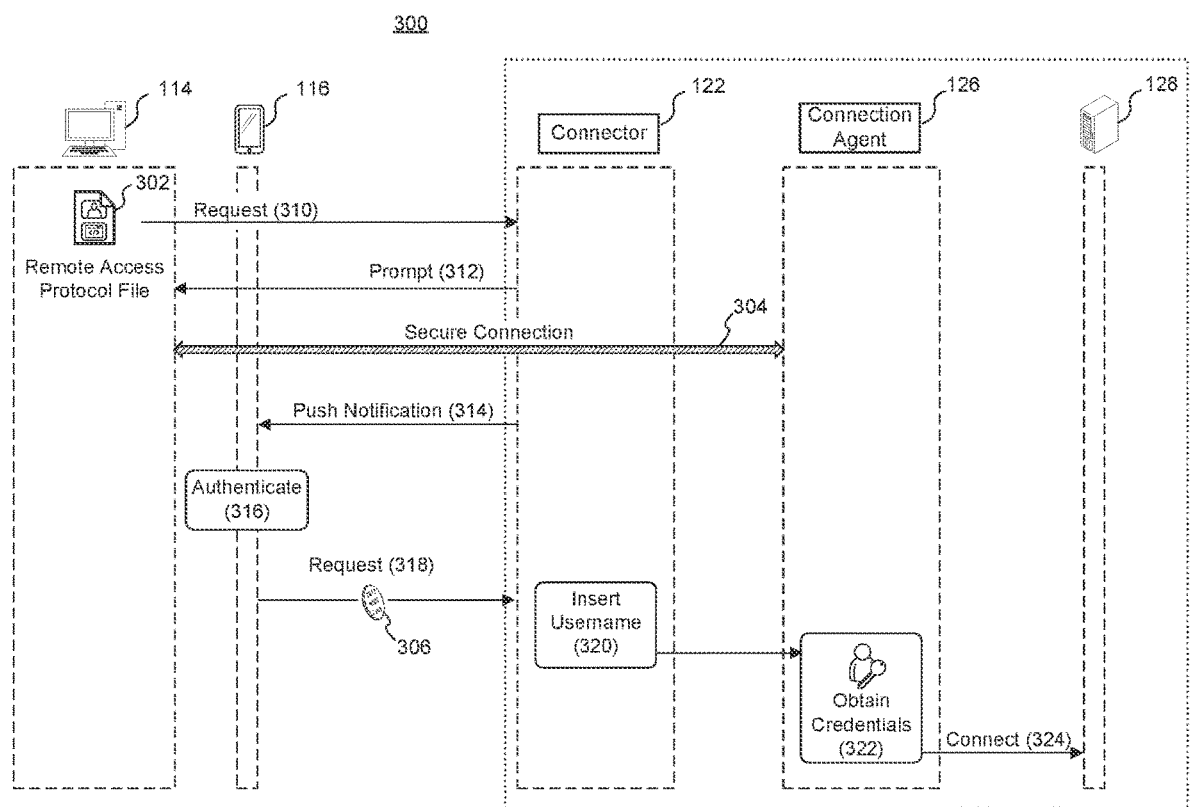
FIG. 3 is a block diagram illustrating an example process for providing native remote access to target resources, consistent with the disclosed embodiments.

FIG. 3 is a block diagram illustrating an example process 300 for providing native remote access to target resources, consistent with the disclosed embodiments. Process 300 may allow a client, such as client identity 110, to establish a secure connection 304 with client system 120 for accessing target resource 128. As used herein, accessing the target resource 128 may include any operations by a client device involving data or information stored on target resource 128. For example, this may include reading information stored on target resource 128, storing information on target resource 128, deleting or modifying information on target resource 128, or any other forms of operations requiring access to the target resource. In some embodiments, access may be restricted to privileged client identities, as discussed above.

As part of process 300, client device 114 may transmit a request in step 310 for accessing target resource 128 of client system 120. In some embodiments, client device 114 may access a remote access protocol file 302. This remote access protocol file 302 may include information for establishing secure connection 304. In particular, remote access protocol file 302 may include information identifying client identity 110 (e.g., an account associated with user 112, etc.) and information identifying a target host for the connection (e.g., connector 122, credentials vault 124, and/or connection agent 126). For example, this information may be represented as an address for a target host, which may include a server name indication (SNI) as part of a transport layer security (TLS) protocol, or any other suitable form of address. In some embodiments, remote access protocol file 302 may be a proprietary protocol file, such as a remote desktop protocol (RDP) file associated with Windows Remote Desktop™, or the like. Of course, remote access protocol file 302 may correspond to other protocols as well. Accordingly, client device 114 may send the request in step 310 using native remote access software, without the need for a VPN client, a browser-based interface, or other non-native software.

In the example of an SNI address, the remote access protocol file 302 may be presented in the form userID.address, where userID is a prefix added to the target host address. In some embodiments, the user ID may be a personal telephone number (e.g., mobile number), or other identifier associated with user 112. In some embodiments, process 300 may include a step of modifying the address within remote access protocol file 302 to include the user ID. For example, user 112 may manually modify the address to include a phone number or other identifier associated with user 112 through a text-based file editor, a graphical user interface, a mobile application, or any other suitable interface. In other embodiments, the user ID may be automatically added, for example, by client device 114, by cloud service 130, or other components of system environment 100. While the userID.address format is provided by way of example, any other suitable formats may be used for representing the user information and the address within remote access protocol file 302. For example, the user ID may be included in a designated field, appended as a suffix to the address, or otherwise included in the file.

Notably, in some embodiments, remote access protocol file 302 and the request of step 310 may not include credentials required to access target resource 128 and may not specifically identify target resource 128. In such embodiments, secure connection 304 may be dynamic in that the connection may be established initially and the details regarding the specific target resource and the user's credentials may be determined subsequently, as described further below. For example, remote access protocol file 302 may include fields or designated spaces for a username and password or other credentials of client identity 110. These fields or spaces may be empty, may include a default text (e.g., "BLANK"), or may include an identifier for identifying the credential fields in later stages. Omitting the user's credentials in this way may improve security by eliminating a potential for the user's credentials to be stolen or otherwise obtained by an attacker. Further, process 300 would not require user 112 to enter separate credentials for accessing client system 120. Thus process 300 allows for a passwordless remote connection to target resource 128. Additional details regarding the authentication of client identity 110 are provided below.

Remote access protocol file 302 may be accessed by client identity 110 in various ways. For example, remote access protocol file 302 may be stored in a memory of client device 114, such as on a local hard drive, a solid state drive, a removable drive, or the like. In some embodiments, remote access protocol file 302 may be stored externally. For example, remote access protocol file 302 may be stored on a cloud-based platform (e.g., in cloud service 130, or other cloud locations), on a remote server, on a separate computing device, or the like. In some embodiments, cloud service 130 may generate remote access protocol file 302 and provide it to client identity 110 for accessing client system 120 and/or other systems.

In some embodiments, the request in step 310 may not be transmitted directly to connector 122. For example, user device 114 may transmit the request to cloud service 130, which may route the request to the correct target host based on the address included in remote access protocol file 302. This may include, for example, extracting the SNI address described above and mapping it to the appropriate connector. Accordingly, cloud service 130 may include or may have access to a database of connector network addresses, connector identifiers, and/or other information to facilitate routing requests in step 310.

In step 312, connector 122 may send a prompt to client device 114 to establish a secure connection 304 with connection agent 126. For example, secure connection 304 may be a tunnel connection, such as a connection using the TLS protocol, or a similar connection protocol. While TLS is used by way of example, it is to be understood that various other forms of secure connections may be used, and the present disclosure is not limited to any particular connection protocol or configuration. Further, while secure connection 304 is shown between client device 116 and connection agent 116, the connection may be with any component or subcomponent of client system 120, including connector 122.

Once the connection has been successfully tunneled, connector 122 may generate and send a push notification in step 314. The push notification may be received through a mobile application on mobile device 116. Through the push notification, user 112 may be prompted for authentication and target account selection. Authentication step 316 may occur in a variety of ways. In some embodiments, authentication may occur by virtue of user 112 having mobile device 116 in his or her possession. Accordingly, the push notification transmitted in step 314, along with the identification of the user in the request in step 310, may provide multi-factor authentication for client identity 110. In some embodiments, additional authentication may be performed, such as biometric authentication (e.g., a retinal scan, facial recognition, a fingerprint scan, a voiceprint identification, etc.), a user pin, a password, scanning a QR code, or the like. According to some embodiments of the present disclosure, an authentication protocol, such as OpenID or Security Assertion Markup Language (SAML), may be used in step 316.

Through mobile device 116, user 112 may also select an account for accessing target resource 128. In some embodiments, the account may be selected automatically. For example, user 112 may be associated with only one account, or may have a preferred or default account that is selected. In other embodiments, user 112 may select from a plurality of accounts through a user interface.

Figure 4:
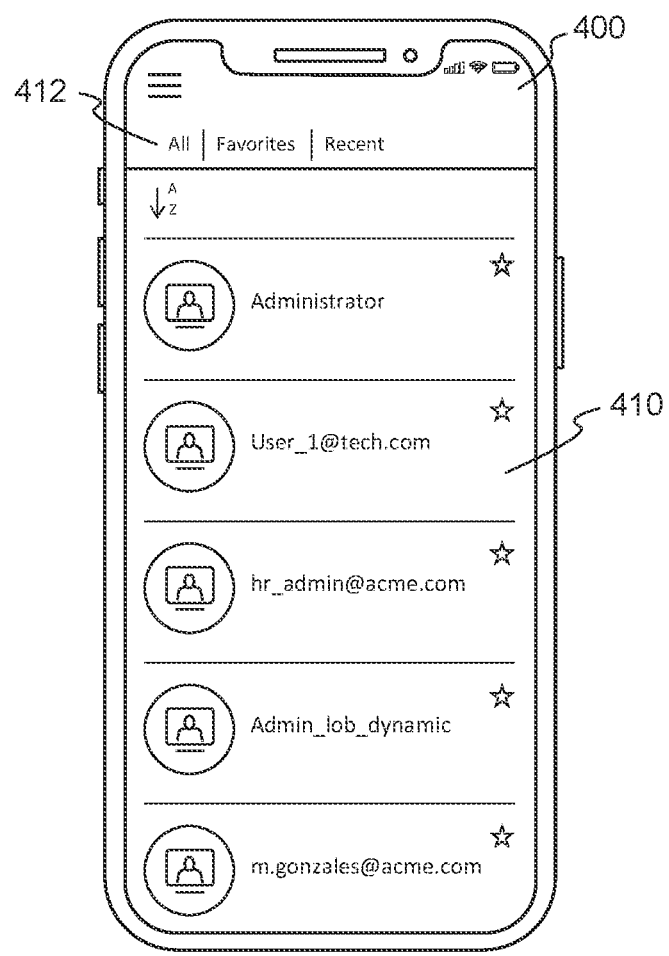
FIG. 4 illustrates an example user interface for selecting an account, consistent with the disclosed embodiments.

FIG. 4 illustrates an example user interface 400 for selecting an account, consistent with the disclosed embodiments. User interface 400 may be displayed, for example, on mobile device 116 and may be associated with a mobile application. As shown in FIG. 4, user interface 400 may present a plurality of accounts, such as account 410, that the user may select through the display of mobile device 116. User interface 400 may further include filters or other options for configuring the display of the available accounts. For example, user interface 400 may include filters 412 for filtering or sorting by accounts designated as favorites, recent accounts selected by user 112, or various other attributes. User interface 400 is shown by way of example, and various other configurations or formats may be used. In some embodiments, the user interface 400 may be presented through a separate device, such as client device 114, or another device accessible by user 114 (e.g., a laptop computer, a tablet, a smartwatch, etc.).

Returning to FIG. 3, process 300 may include a step 318 for transmitting a request to connector 112 for accessing target resource 128. This request may include a token 306, that is provided to connector 122. In some embodiments, token 306 may be a temporary token generated by mobile device 116 for one-time access to client system 120. In some embodiments, token 306 may be generated by another device or service, such as cloud service 130. In some aspects of the present disclosure, token 306 may further be valid only for a limited period of time.

Token 306 may include an identifier of target resource 128. For example, client system 120 may include a plurality of target resources associated with target identity information, and token 306 may identify target resource 128 from among the plurality of target resources. The target identity information may be stored locally within client system 120 (e.g., in memory 220) or in an external storage location (e.g., a remote server, a cloud-based platform, etc.).

In step 320, connector 122 may then modify the request to include a username based on token 306. In some embodiments, this may include intervening in the remote desktop protocol to replace the remote desktop username in the request of step 310 with token 306. For example, as described above, remote access protocol file 302 may include a username field that is blank, or that has a placeholder or default value. Accordingly, step 320 may include inserting the blank username or replacing the placeholder with token 306, which will serve as the username for accessing target resource 128. Therefore, the connection may be established initially without requiring the username to be included in the request of step 310.

In step 322, connection agent 126 may receive credentials associated with token 306. In some embodiments, the credentials may be received from credentials vault 124. For example, connection agent 126 may receive token 306 and may use token 306 to retrieve credentials corresponding to account 410 selected by user 112. Connection agent 126 may then assert the retrieved credentials at target resource 128 on behalf of client identity 110, as shown in step 324. Accordingly, client identity 110 may access target resource 128 without receiving the credentials from credentials vault 130, which may reduce security vulnerabilities in system environment 110 by preventing them from being exposed to attackers. Further, a separate password is not required for accessing target resource 128 through the remote access protocol used by client device 114. Access can also be granted without the need for a dedicated client, such as a VPN client, a browser-based interface, or other non-native system components.

In some embodiments, steps 322 and 324 may be performed without connection agent 126. For example, connector 122 may access the credentials of step 322 directly from credentials vault 124, without connection agent 126, and may further assert the credentials on behalf of client identity 110. In some embodiments, the credentials may not be retrieved by connector 122 or connection agent 126, but may be provided by client device 114. For example, the credentials may be stored locally (e.g., in a cache, etc.) on client device 114. In some embodiments, client identity 110 may receive the credentials after they are obtained in step 322. For example, after step 322, connection agent 126 and/or connector 122 may transmit the obtained credentials to client device 114 and/or mobile device 116.

Figure 5:
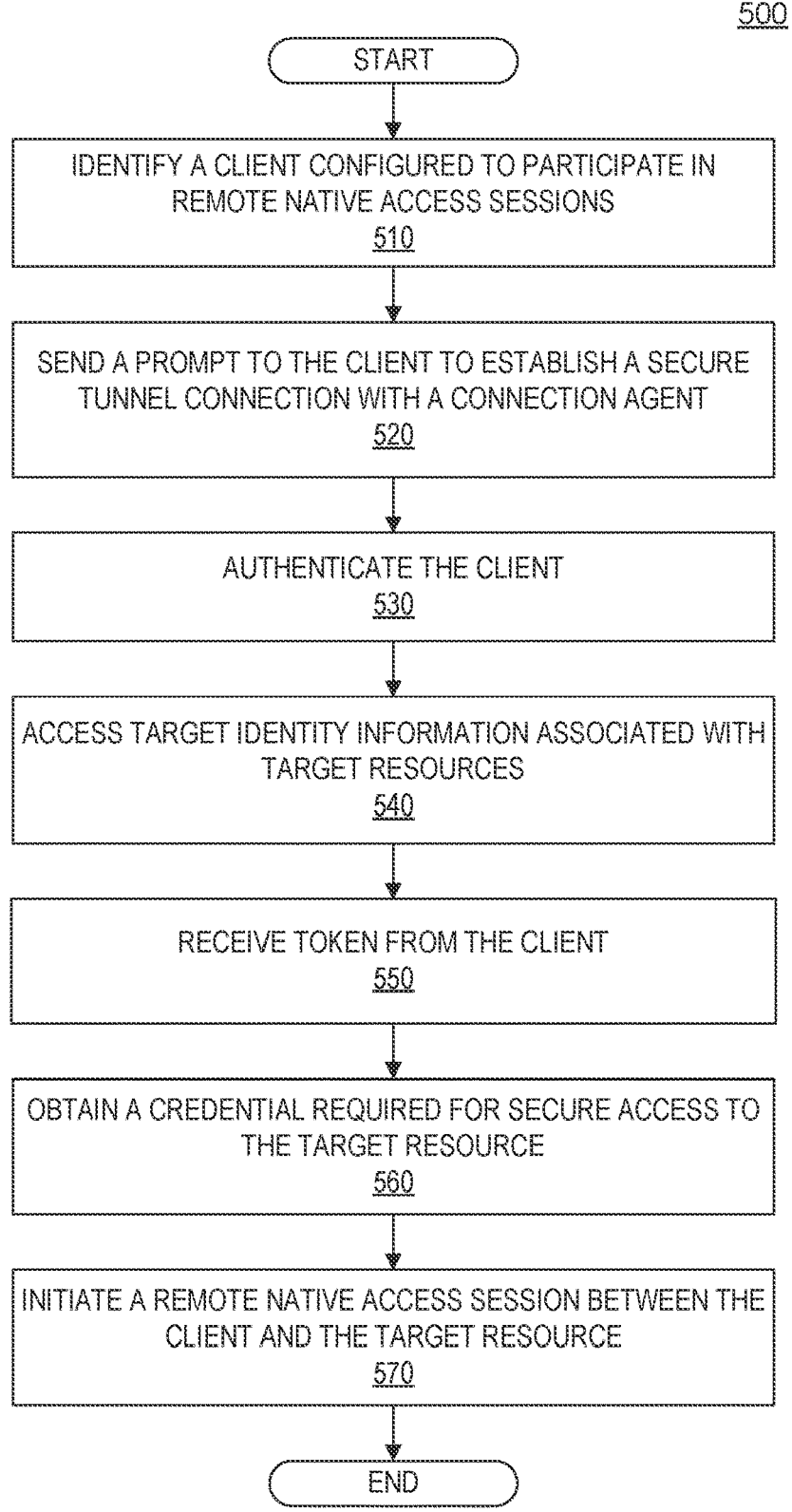
FIG. 5 is a flowchart depicting an example process for securely establishing secretless and remote native access sessions, consistent with the disclosed embodiments.

FIG. 5 is a flowchart depicting an example process 500 for securely establishing secretless and remote native access sessions, consistent with the disclosed embodiments. Process 500 may be performed by at least one processing device, such as processor 210 of connector 122, as described above. It is to be understood that throughout the present disclosure, the term "processor" is used as a shorthand for "at least one processor." In other words, a processor may include one or more structures that perform logic operations whether such structures are collocated, connected, or disbursed. In some embodiments, a non-transitory computer readable medium may contain instructions that when executed by a processor cause the processor to perform process 500. Further, process 500 is not necessarily limited to the steps shown in FIG. 5, and any steps or processes of the various embodiments described throughout the present disclosure may also be included in process 500, including those described above with respect to FIG. 3.

In step 510, process 500 may include identifying a client configured to participate in remote native access sessions. For example, step 510 may identify client identity 110 and thus the client may include user 112, an account associated with user 112, and/or client device 114. The client may be identified in various ways. In some embodiments, the client may be identified based on a request received from client device 114, as shown in step 310 of FIG. 3. In some embodiments, the client may have a remote access protocol file that has been modified to include an identifier associated with the client. For example, the client may access remote access protocol file 302, as discussed above, which may have been modified to include at least one of a mobile telephone number, an email address, a user name, an account name, a custom identifier created by the client, a random or semi-random identifier, a customer number, an IP address, or various other identifiers that may be associated with the client. The remote access protocol file 302 may be modified by the client or may be modified by other components of system environment 100, including cloud service 130. In some embodiments, the client may be identified by cloud service 130 as described above. For example, cloud service 130 may extract an address (e.g., an SNI indicating a hostname) from a request from client identity 110 and may route the request based on the address. In some embodiments, the remote access protocol file 302 may comply with a remote desktop protocol, as described above.

In step 520, process 500 may include sending a prompt to the client to establish a secure tunnel connection with a connection agent using the identifier associated with the client. For example, step 520 may correspond to step 312 for establishing secure connection 304 with connection agent 126, as described above with respect to FIG. 3. The secure tunnel connection may include any form of secure connection according to a tunneling protocol, including, but not limited to TLS, IP in IPv4/IPv6, Generic Routing Encapsulation (GRE), Secure Socket Tunneling Protocol (STTP), Internet Protocl Security (IPSec), Layer 2 Tunneling Protocol (L2TP), Virtual Extensible Local Area Network (VXLAN), or the like. As shown in FIG. 1, connection agent 126 and target resource 128 may be included in the same client system 120. Accordingly, the connection agent may be located in a local network, a virtual network, or other form of network in which the target resource 128 is also located.

In step 530, process 500 may include authenticating the client, which may be performed in various ways. For example, authentication of the client may be performed according to at least one of OpenID, SAML, or similar authentication protocols. In some embodiments, step 530 may include sending a push notification to a mobile device associated with the client. For example, mobile device 116 may receive a push notification as shown in step 314 and described above. Accordingly, the mobile device 116 may be configured to authenticate the client through an application on mobile device 116.

In step 540, process 500 may include accessing target identity information associated with one or more target resources. For example, client system 120 may include a plurality of target resources, including target resource 128, each which may be associated with target identity information. This target identity information may be stored, for example, in a database, a memory device (e.g., memory device 220), on a remote server or cloud-storage platform, or various other storage locations. In some embodiments, the plurality of target resources may be identified based on the identified client. For example, the plurality of target resources are identified based on access rights of the client, or based on the authentication of the client.

In step 550, process 500 may include receiving from the client a token that identifies a target resource from among the one or more target resources. For example, step 550 may include receiving token 306, as described above with respect to FIG. 3. In some embodiments, the target resource 128 may be selected by a user. Accordingly, process 500 may further include receiving a selection by the client of the target resource 128 from among the plurality of target resources. In some embodiments, the selection may be made through a graphical user interface, similar to user interface 400 shown in FIG. 4. For example, process 500 may further comprise sending to the client data for generating a selectable menu of the plurality of target resources. The selectable menu of the plurality of target resources comprises icons and identifying data associated with the plurality of target resources.

In step 560, process 500 may include obtaining, based on the token, a credential required for secure access to the target resource. For example, step 560 may comprise obtaining credentials associated with the target resource 128 identified in the token. As described above with respect to FIG. 3, the credential may be obtained from a secure credentials vault, such as credentials vault 124. Accordingly, the credential may be obtained without making the credential available to the client. In other embodiments, the credential may be obtained locally at the client, and deleted at the client upon termination of the remote native access session. As described above with respect to step 322, in some embodiments, the credential may be obtained in a secretless manner from the perspective of the client. Accordingly, the client may not be required to submit the credential or other credentials for accessing the target resource 128. In some embodiments, process 500 may further include replacing a username in a request for the remote native access session with data from the token. For example, process 500 may include inserting the token or data from the token into the remote access protocol file associated with the client. Alternatively, this may be performed by connection agent 126, or other components of client system 120.

At step 570, process 500 may include initiating, using the credential, a remote native access session between the client and the target resource. Accordingly, process 500 may allow the client to access the target resource in a passwordless manner (and without requiring transmission of other forms of secure credentials) and may be done through native remote protocol software (e.g., without requiring a separate agent or non-native software). As discussed above, the remote native access session may comply with various different remote access protocols and techniques.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for securely establishing secretless and remote native access sessions, the operations comprising:
    identifying a request by a client to participate in a remote native access session with a target resource, the target resource requiring a credential for secure access by the client, wherein the client has a remote access protocol file including information for establishing a secure tunnel connection using a native remote access client without using the credential, wherein the remote access protocol file includes:

an identifier associated with the client, the identifier being distinct from the credential; and at least one of a field or a designated space for the credential, the field or the designated space being blank or including default text other than the credential;

intercepting the request prior to the request reaching the target resource;

sending a prompt to the client to establish the secure tunnel connection with a connection agent using the identifier associated with the client, the identifier being accessed from the remote access protocol file, wherein the secure tunnel connection is established without using the credential;

authenticating the client, wherein authenticating the client includes transmitting a notification to a mobile device associated with the user;

receiving from the client, via the secure tunnel connection, an additional request to access the target resource, wherein the additional request includes a token identifying the target resource from among one or more target resources;

obtaining the credential based on the token and an account selected by a user; and initiating the remote native access session between the client and the target resource, wherein initiating the remote native access session includes:

modifying the intercepted request to include the credential; and submitting the modified request on behalf of the client.

2. The non-transitory computer readable medium of claim 1, wherein the remote access protocol file is modified to include the identifier.

3. The non-transitory computer readable medium of claim 2, wherein the remote access protocol file is modified by the client.

4. The non-transitory computer readable medium of claim 1, wherein the identifier is a custom identifier created by the client.

5. The non-transitory computer readable medium of claim 1, wherein the credential is obtained in a secretless manner from the perspective of the client.

6. The non-transitory computer readable medium of claim 1, wherein the remote access protocol file is a remote desktop protocol.

7. The non-transitory computer readable medium of claim 1, wherein the credential includes at least one of a username, an SSH key, an access token, a security token, or a password and the identifier associated with the client is at least one of: a mobile telephone number, an email address, or a custom identifier created by the client.

8. The non-transitory computer readable medium of claim 1, wherein the token is generated using the mobile device associated with the user.

9. The non-transitory computer readable medium of claim 1, wherein the account is selected using the mobile device associated with the user.

10. The non-transitory computer readable medium of claim 1, wherein the operations further comprise identifying the one or more target resources based on access rights of the client.

11. A computer-implemented method for securely establishing secretless and remote native access sessions, the method comprising:

identifying a request by a client to participate in a remote native access session with a target resource, the target resource requiring a credential for secure access by the client, wherein the client has a remote access protocol file including information for establishing a secure tunnel connection using a native remote access client without using the credential, wherein the remote access protocol file includes:

an identifier associated with the client, the identifier being distinct from the credential, the identifier being accessed from the remote access protocol file, wherein the secure tunnel connection is established without using the credential; and at least one of a field or a designated space for the credential, the field or the designated space being blank or including default text other than the credential;

intercepting the request prior to the request reaching the target resource;

sending a prompt to the client to establish the secure tunnel connection with a connection agent using the identifier associated with the client;

authenticating the client, wherein authenticating the client includes transmitting a notification to a mobile device associated with the user;

receiving from the client, via the secure tunnel connection, an additional request to access the target resource, wherein the additional request includes a token identifying the target resource from among one or more target resources;

obtaining the credential based on the token and an account selected by a user; and initiating the remote native access session between the client and the target resource, wherein initiating the remote native access session includes:

modifying the intercepted request to include the credential; and submitting the modified request on behalf of the client.

12. The computer-implemented method of claim 11, wherein the credential is obtained without making the credential available to the client.

13. The computer-implemented method of claim 11, further comprising sending to the client data for generating a selectable menu of the one or more target resources, the target resource being selected through the selectable menu.

14. The computer-implemented method of claim 13, wherein the selectable menu of the one or more target resources comprises icons and identifying data associated with the one or more target resources.

15. The computer-implemented method of claim 13, further comprising causing the selectable menu to be displayed on the mobile device associated with the user.

16. The computer-implemented method of claim 13, wherein the authentication of the client is performed according to at least one of: OpenID or Security Assertion Markup Language.

17. The computer-implemented method of claim 11, wherein the connection agent is located in a local network in which the target resource is also located.

18. The computer-implemented method of claim 11, wherein the connection agent is located in a virtualized network in which the target resource is also located.

* * * * *